(12) United States Patent
Finateu et al.

(10) Patent No.: US 11,412,162 B2
(45) Date of Patent: Aug. 9, 2022

(54) SYSTEMS AND METHODS FOR ASYNCHRONOUS, TIME-BASED IMAGE SENSING

(71) Applicant: PROPHESEE, Paris (FR)

(72) Inventors: Thomas Finateu, Veneux les Sablons (FR); Daniel Matolin, Freital (DE); Christoph Posch, Bad Fischau-Brunn (AT)

(73) Assignee: PROPHESEE, Paris (FR)

( * ) Notice: Subject to any disclaimer, the term of this patent is extended or adjusted under 35 U.S.C. 154(b) by 151 days.

(21) Appl. No.: 17/051,148

(22) PCT Filed: Apr. 30, 2019

(86) PCT No.: PCT/EP2019/061133
§ 371 (c)(1),
(2) Date: Oct. 27, 2020

(87) PCT Pub. No.: WO2019/211317
PCT Pub. Date: Nov. 7, 2009

(65) Prior Publication Data
US 2021/0235028 A1    Jul. 29, 2021

(30) Foreign Application Priority Data
Apr. 30, 2018   (EP) .................................... 18170201

(51) Int. Cl.
*H04N 5/353*   (2011.01)
*H04N 5/3745*  (2011.01)
*H04N 5/378*   (2011.01)

(52) U.S. Cl.
CPC ........... *H04N 5/3535* (2013.01); *H04N 5/378* (2013.01); *H04N 5/37455* (2013.01)

(58) Field of Classification Search
CPC ... H04N 5/3535; H04N 5/37455; H04N 5/378
See application file for complete search history.

(56) References Cited

U.S. PATENT DOCUMENTS 10,109,057 B2 * 10/2018 Benosman .............. G06T 7/246
10,827,135 B2 * 11/2020 Stobie .................... H04N 5/378
(Continued)

FOREIGN PATENT DOCUMENTS

EP    2 933 995 A1    10/2015

OTHER PUBLICATIONS

Brandli, Christian et al., "A 240×180 dB 3 us Latency Global Shutter Spatiotemporal Vision Sensor," IEEE Journal of Solid-State Circuits, vol. 49, No. 10, Oct. 2014, p. 2333-2341.
(Continued)

*Primary Examiner* — Nhan T Tran
(74) *Attorney, Agent, or Firm* — Finnegan, Henderson, Farabow, Garrett & Dunner LLP

(57) ABSTRACT

An image sensor includes a plurality of pixels, each pixel including a photosensitive element, and a photo-signal converter adapted to provide, on a first output, a current signal linearly proportional to the intensity of light impinging on the photosensitive element and to provide, on a second output, a voltage signal logarithmic with the intensity of light impinging on the photosensitive element. Each pixel further includes a detector adapted to generate a trigger signal when a signal of the detector proportional to the voltage signal of the second output of the photo-signal converter exceeds a threshold, and a light-to-time converter adapted to measure and encode, in the time domain, light intensity on the photosensitive element. A light-to-time conversion cycle may be initiated by the light-to-time converter in response to receipt of the trigger signal.

20 Claims, 14 Drawing Sheets

(56) References Cited

U.S. PATENT DOCUMENTS

2014/0326854 A1* 11/2014 Delbruck .............. G01J 1/0238
250/204
2018/0098003 A1 4/2018 Matolin et al.

OTHER PUBLICATIONS

Berner, Raphael et al., A 240×180 10mW 12 us Latency Sparse-Output Vision Sensor for Mobile Application, 2013 Symposium on VLSI Circuits Digest of Technical Papers, p. C186-C187.
Posch, Christoph et al., "A QVGA 143 dB Dynamic Range Frame-Free PWM Image Sensor With Lossless Pixel-Level Video Compression and Time-Dom275ain CDS," IEEE Journal of Solid-State Circuits, vol. 46, No. 1, Jan. 2011, pp. 259-275.
Posch, Christoph et al., "Retinomorphic Event-Based Vision Sensors: Bioinspired Cameras With Spiking Output," Proceedings of the IEEE, vol. 102, No. 10, Oct. 2014, pp. 1470-1484.
International Search Report dated Jul. 11, 2019 for PCT/EP2019/061133, filed on Apr. 30, 2019 (4 pgs).
Written Opinion of the International Searching Authority dated Jul. 11, 2019 for PCT/EP2019/061133 filed on Apr. 30, 2019 (6 pgs).

* cited by examiner

SYSTEMS AND METHODS FOR ASYNCHRONOUS, TIME-BASED IMAGE SENSING

CROSS REFERENCE TO RELATED APPLICATION(S)

This application is a U.S. National Stage application of International Application No. PCT/EP2019/061133, filed on Apr. 30, 2019, which claims priority to European Application No. 18170201.0, filed on Apr. 30, 2018, the contents of which are incorporated herein by reference to their entireties.

TECHNICAL FIELD

The present disclosure relates generally to the field of image sensing. More specifically, and without limitation, this disclosure relates to systems and methods for asynchronous, time-based image sensing. The image sensors and techniques disclosed herein may be used in various applications and vision systems, such as security systems, autonomous vehicles, and other systems that benefit from rapid and efficient motion detection.

BACKGROUND

Extant image sensors use a plurality of pixels comprising semiconductor charge-coupled devices (CCD), complementary metal-oxide-semiconductor (CMOS) sensors, N-type metal-oxide-semiconductor (NMOS) sensors, or other sensors in order to capture digital images of scenes. However, conventional image sensors are slow at detecting rapid motion because each frame is captured as a full image of the scene. Moreover, such image sensors produce large amounts of data, exponentially increasing the amount of post-processing required to sift out, for example, motion information from the captured images.

Indeed, many existing technologies do not require the vast detail provided by image sensors that capture full images. For example, security systems or other similar systems may only be interested in motion data and not in portions of the image having no motion. In another example, autonomous vehicles must process captured data quickly and efficiently in order to make decisions comparable with human perception time (generally on the order of 1 second or less). Such efficiency is capped when large amounts of data must be discarded (e.g., via post-processing) in order to obtain the portion of captured data relevant to the situation.

SUMMARY

In view of the foregoing, embodiments of the present disclosure provide an asynchronous image sensor with a plurality of pixels. By operating asynchronously, the image sensor uses less power and produces less superfluous data than extant image sensors. In addition, the output of the asynchronous image sensor is limited to pixels of interest (e.g., pixels in which changes, possibly due to motion, occur), eliminating the need for costly or inefficient post-processing to identify pixels of interest. Accordingly, reducing data redundancy in the captured images is performed by the pixel itself rather than by costly post-processing.

Moreover, embodiments of the present disclosure provide a time-based image sensor. By performing a light-to-time conversion within the image sensor, the analog output requires less post-processing to convert to digital output. In addition, the light-to-time conversion may be performed on a pixel-by-pixel basis. This reduces the need for a complex readout system because the output of the pixels is ready for immediate conversion to digital signals rather than requiring further processing, such as sampling and holding and/or other processing by an auxiliary circuit.

According to an exemplary embodiment of the present disclosure, an asynchronous time-based image sensor is provided that includes a plurality of pixels. The pixels may be arranged in an array. Each pixel may include a photosensitive element, a photo-signal converter connected to the photosensitive element, a detector, and a light-to-time converter connected to a first output of the photo-signal converter. The photo-signal converter may be configured to provide on the first output a current signal that is linearly proportional to the intensity of light impinging on the photosensitive element, and to provide on a second output a voltage signal that is logarithmic with the intensity of light impinging on the photosensitive element. The detector may be configured to generate, autonomously and independently of detectors of other pixels, a trigger signal when a signal of the detector proportional to the voltage signal of the second output of the photo-signal converter exceeds at least one threshold. In some embodiments, the signal of the detector is a voltage signal or a current signal. In still further embodiments, the detector is configured to generate a trigger signal in response to detecting a predefined condition of the second output of the photo-signal converter.

In some embodiments, the light-to-time converter may be configured to measure and encode, in the time domain, light intensity on the photosensitive element. In some embodiments, a light-to-time conversion cycle is initiated by the light-to-time converter in response to receipt of the trigger signal from the detector.

In some embodiments, the light-to-time converter may be configured to communicate the initiation of the light-to-time conversion cycle to a readout system that is external to the plurality of pixels. Additionally or alternatively, the light-to-time converter may be configured to communicate a completion of the light-to-time conversion cycle to the readout system.

In any embodiments where the light-to-light converter communicates with a readout system, the readout system may be configured to combine address information for each pixel with the light-to-time conversion cycle initiation and completion information received from the light-to-time converter of the respective pixel. In such embodiments, the pixel address information and the light-to-time conversion cycle initiation and completion information may be synchronized and time-stamped by a digital processing system external to the plurality of pixels.

In any of the embodiments listed above, the light-to-time converter may comprise at least one capacitor that is configured to be charged during the light-to-time conversion cycle by the current signal of the first output of the photo-signal converter, and the light-to-time conversion cycle may be completed by the light-to-time converter in response to detecting, with a comparator, that a voltage across the capacitor has reached a reference voltage. In such embodiments, the reference voltage may be variable between a plurality of reference voltage levels. For example, the light-to-time converter may be configured to decrease the reference voltage to a different reference voltage level each time the voltage across the capacitor reaches the reference voltage.

In any of the embodiments listed above, the light-to-time converter may be configured to initiate the light-to-time conversion cycle by opening a switch in parallel with a capacitor. In such embodiments, the light-to-time converter may also be configured to close the switch to discharge the capacitor before opening the switch to initiate the light-to-time conversion cycle.

In any of the embodiments listed above, the light-to-time converter may be configured to send a reset signal to the detector in response to receipt of the trigger signal from the detector. Additionally or alternatively, the light-to-time converter may be further configured to reset and initiate a new light-to-time conversion cycle when another trigger signal is received before completion of a current light-to-time conversion cycle.

In any of the embodiments listed above, a first supply voltage to the photo-signal converter may differ from a second supply voltage to the light-to-time converter.

In any of the embodiments listed above, the photo-signal converter may be a gain-boost photo-signal converter.

According to another exemplary embodiment of the present disclosure, an asynchronous time-based image sensor is provided that includes a plurality of pixels. Each pixel may include a photosensitive element; a photo-signal converter that is connected to the photosensitive element; a detector; a capacitor and a switch connected in parallel and to a first output of the photo-signal converter; a comparator connected to the first output; and a logic circuit connected to the comparator and the detector. The photo-signal converter may be configured to provide on the first output a current signal that is linearly proportional to the intensity of light impinging on the photosensitive element, and to provide on a second output a voltage signal that is logarithmic with the intensity of light impinging on the photosensitive element. The detector may be configured to generate, autonomously and independently of detectors of other pixels, a trigger signal when a signal of the detector proportional to the voltage signal of the second output of the photo-signal converter exceeds a threshold. In some embodiments, the signal of the detector is a voltage signal or a current signal. In still further embodiments, the detector is configured to generate a trigger signal in response to detecting a predefined condition of the second output of the photo-signal converter.

In some embodiments, the logic circuit may be configured to initiate a light-to-time conversion cycle by opening the switch in response to the receipt of the trigger signal from the detector, and complete the light-to-time conversion cycle in response to the comparator detecting that a voltage across the capacitor reaches a reference voltage. In addition, the logic circuit may be configured to communicate the initiation and completion of the light-to-time conversion cycle to a readout system external to the image sensor. With the above embodiment, the capacitor may be charged during the light-to-time conversion cycle by the current signal of the first output of the photo-signal converter.

In some embodiments, the readout system may be configured to combine address information for each pixel with the light-to-time conversion cycle initiation and completion information received from the logic circuit of the respective pixel. In such embodiments, the pixel address information and the light-to-time conversion cycle initiation and completion information may be synchronized and time-stamped by a digital processing system external to the plurality of pixels.

In any of the embodiments listed above, the reference voltage may be variable between a plurality of reference voltage levels. In such embodiments, the comparator may be configured to decrease the reference voltage to a different reference voltage level each time the voltage across the capacitor reaches the reference voltage.

In any of the embodiments listed above, the logic circuit is configured to close the switch to discharge the capacitor before opening the switch to initiate the light-to-time conversion cycle. Additionally or alternatively, the logic circuit may be configured to send a reset signal to the detector in response to receipt of the trigger signal from the detector. Additionally or alternatively, the logic circuit may be configured to reset and initiate a new light-to-time conversion cycle when another trigger signal is received before completion of a current light-to-time conversion cycle.

In any of the embodiments listed above, a first supply voltage to the photo-signal converter may differ from a second supply voltage to the capacitor, the switch, and the comparator.

In any of the embodiments listed above, the photo-signal converter may be a gain-boost photo-signal converter.

According to another exemplary embodiment of the present disclosure, a method is provided for asynchronous time-based image sensing with a plurality of pixels. Each pixel may comprise a photosensitive element, a photo-signal converter connected to the photosensitive element, a detector, and a light-to-time converter connected to the photo-signal converter. The method may comprise providing, at a first output of the photo-signal converter, a current signal that is linearly proportional to the intensity of light impinging on the photosensitive element, and providing, at a second output of the photo-signal converter, a voltage signal that is logarithmic with the intensity of light impinging on the photosensitive element. The method may further comprise generating with the detector, and autonomously and independently of detectors of other pixels, a trigger signal when a signal of the detector proportional to the voltage signal of the second output of the photo-signal converter exceeds at least one threshold, and encoding, with the light-to-time converter, light intensity on the photosensitive element into time elapsing information, the time elapsing information comprising an initiation time of a light-to-time conversion cycle and a completion time of the light-to-time conversion cycle. In some embodiments, the light-to-time conversion cycle is initiated by the light-to-time converter in response to receipt of the trigger signal from the detector. In some embodiments, the signal of the detector is a voltage signal or a current signal. In still further embodiments, the method may comprise generating a trigger signal in response to detecting a predefined condition of the second output of the photo-signal converter.

In some embodiments, the method may further comprise communicating, with the light-to-time converter, the initiation time of the light-to-time conversion cycle to a readout system that is external to the plurality of pixels and further communicating, with the light-to-time converter, the completion time of the light-to-time conversion cycle to the readout system.

In any of the embodiments listed above, the method may further comprise charging, during the light-to-time conversion cycle, a capacitor using the current signal of the first output of the photo-signal converter and detecting, with a comparator, the completion time of the light-to-time conversion cycle when it is determined that a voltage across the capacitor has reached a reference voltage.

In any of the embodiments listed above, the method may further comprise combining, at the readout system, address information for each pixel with the light-to-time conversion cycle initiation and completion information received from the light-to-time converter of the respective pixel. In such embodiments, the method may further comprise synchronizing and time-stamping the pixel address information and the light-to-time conversion cycle initiation and completion information by a digital processing system external to the plurality of pixels.

In any of the embodiments listed above, the method may further comprise varying the reference voltage between a plurality of reference voltage levels. In such embodiments, the method may further comprise decreasing the reference voltage to a lower reference voltage level each time the voltage across the capacitor reaches the reference voltage.

In any of the embodiments listed above, the method may further comprise initiating the light-to-time conversion cycle comprises opening a switch in parallel with a capacitor. Additionally or alternatively, the method may further comprise closing the switch to discharge the capacitor before opening the switch to initiate the light-to-time conversion cycle.

In any of the embodiments listed above, the method may further comprise sending a reset signal to the detector in response to receipt of the trigger signal from the detector. Additionally or alternatively, the method may further comprise, when another trigger signal is received before completion of a current light-to-time conversion cycle, resetting and initiating a new light-to-time conversion cycle and sending a cancellation signal to a readout system that is external to the plurality of pixels.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the principles and features of the disclosed embodiments. In the drawings.

DETAILED DESCRIPTION

Figure 1:
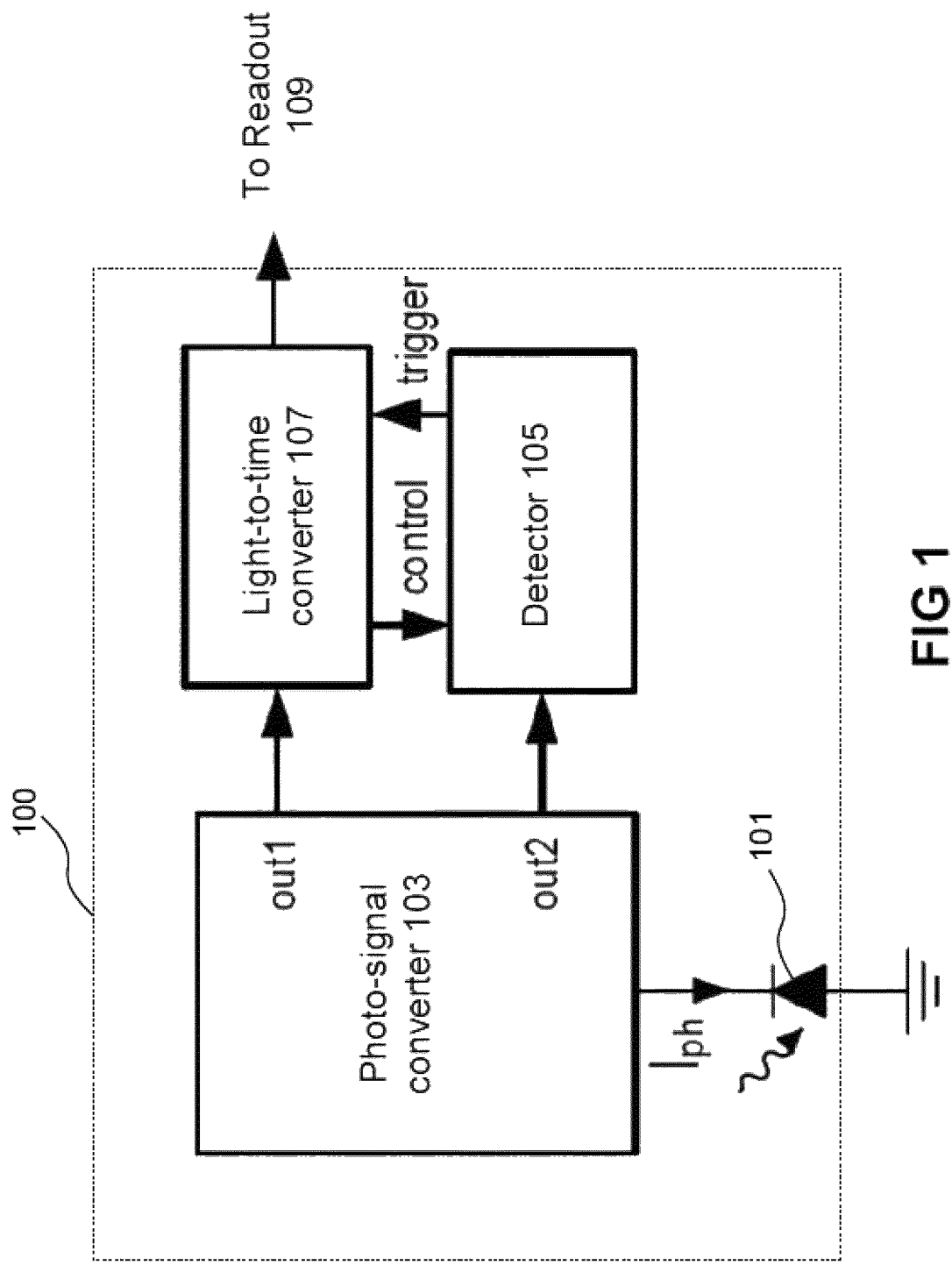
FIG. 1 is a schematic representation of an exemplary pixel, according to embodiments of the present disclosure.

The disclosed embodiments relate to systems and methods for asynchronous, time-based image sensing. Advantageously, the exemplary embodiments can provide fast and efficient image sensing. Embodiments of the present disclosure may be implemented and used in various applications and vision systems, such as security systems, autonomous vehicles, and other systems that benefit from rapid and efficient motion detection. Although embodiments of the present disclosure are described with general reference to an imaging system, it will be appreciated that such a system may part of a camera, a LIDAR, or other imaging system.

According to an aspect of the present disclosure, an asynchronous time-based image sensor is described. The image sensor may have a plurality of pixels. As used herein, a "pixel" refers to a smallest element of the sensor that converts light into an electrical signal. Also, as disclosed herein, the pixels may be provided in an array of any suitable size and shape for the imaging system.

In some embodiments, each pixel may comprise a photosensitive element. For example, the photosensitive element may comprise a photodiode (e.g., in a p-n junction or PIN structure) or any other element configured to convert light into an electrical signal. The photodiode may generate a current $I_{ph}$ proportional to the intensity of light impinging on the photodiode.

In some embodiments, each pixel may further comprise a photo-signal converter connected to the photosensitive element. The photo-signal converter may be configured to provide on a first output a current signal that is linearly proportional to the intensity of light impinging on the photosensitive element, and to provide on a second output a voltage signal that is logarithmic with the intensity of light impinging on the photosensitive element. For example, the photo-signal converter may comprise a plurality of transistors, such as metal-oxide-semiconductor (MOS) transistors, complementary metal-oxide-semiconductor (CMOS) transistors, or any other three-terminal circuit element configured to amplify or switch electronic signals.

In some embodiments, each pixel may further comprise a detector. The detector may be configured to generate, autonomously and independently of detectors of other pixels, a trigger signal when a signal of the detector proportional to the voltage signal of the second output of the photo-signal converter exceeds a threshold. For example, the detector may comprise one or more voltage comparators and one or more capacitors arranged to reset upon receive of a control signal and to send the trigger signal when the threshold is exceeded.

In some embodiments, each pixel may further comprise a light-to-time converter connected to a first output of the photo-signal converter. The light-to-time converter may be configured to measure and encode, in the time domain, light intensity on the photosensitive element. For example, the light-to-time converter may comprise a capacitor and a switch in parallel, as well as a comparator. A light-to-time conversion cycle may be initiated by the light-to-time converter in response to receipt of the trigger signal from the detector. Accordingly, the light intensity may be encoded in the time between the trigger signal and a completion signal from the comparator of the light-to-time converter.

As used herein, the term "capacitor" refers to either a discrete device comprising two parallel (or substantially parallel) plates, optionally with a dielectric therebetween, or to parasitic capacitance present at a circuit node, e.g., due to a semiconductor implementation of other circuit elements.

According to another aspect of the present disclosure, another asynchronous time-based image sensor is described that includes at least one capacitor. The image sensor may have a plurality of pixels, as described above. In some embodiments, each pixel may comprise a photosensitive element, as described above. Moreover, each pixel may comprise a photo-signal converter that is connected to the photosensitive element and a detector, as described above.

In some embodiments, each pixel may further comprise a capacitor and a switch connected in parallel to a first output of the photo-signal converter, and a comparator also connected to the first output. In some embodiments, each pixel may further comprise a logic circuit, connected to the comparator and the detector. The logic circuit may be configured to initiate a light-to-time conversion cycle by opening the switch in response to the receipt of the trigger signal from the detector, and complete the light-to-time conversion cycle in response to the comparator detecting that a voltage across the capacitor reaches a reference voltage. Further, the logic circuit may be configured to communicate (e.g., using an address-event representation (AER) protocol) the initiation and completion of the light-to-time conversion cycle to a system or database external to the image sensor. In the above embodiment, the capacitor may be charged during the light-to-time conversion cycle by the current signal of the first output of the photo-signal converter.

According to another aspect of the present disclosure, a method is provided for asynchronous time-based image sensing with a plurality of pixels. As explained above, each pixel may comprise a photosensitive element, a photo-signal converter connected to the photosensitive element, a detector, and a light-to-time converter connected to the photo-signal converter.

In some embodiments, the method may comprise providing, at a first output of the photo-signal converter, a current signal that is linearly proportional to the intensity of light impinging on the photosensitive element. For example, a plurality of transistors may be arranged to provide the first output, as explained above.

In some embodiments, the method may further comprise providing, at a second output of the photo-signal converter, a voltage signal that is logarithmic with the intensity of light impinging on the photosensitive element. For example, the plurality of transistors may be arranged to provide the second output in addition to the first output.

In some embodiments, the method may further comprise generating with the detector, and autonomously and independently of detectors of other pixels, a trigger signal when a signal of the detector proportional to the voltage signal of the second output of the photo-signal converter exceeds a threshold. For example, a plurality of comparators and capacitors may be arranged to generate the trigger signal. In some embodiments, the signal of the detector is a voltage signal or a current signal. In still further embodiments, the detector is configured to generate a trigger signal in response to detecting a predefined condition of the second output of the photo-signal converter.

In some embodiments, the method may further comprise encoding, with the light-to-time converter, light intensity on the photosensitive element into time elapsing information. The time elapsing information may comprise an initiation time of a light-to-time conversion cycle (e.g., based on the trigger signal) and a completion time of the light-to-time conversion cycle (e.g., based on a completion signal from the light-to-time converter). The light-to-time conversion cycle may be initiated by the light-to-time converter in response to receipt of the trigger signal from the detector.

FIG. 1 is a schematic representation of an exemplary pixel 100, consistent with embodiments of the present disclosure. As shown in the example of FIG. 1, pixel 100 includes a photosensitive element 101 (e.g., a photodiode) and a photo-signal converter 103. The photosensitive element 101 may generate a current $I_{ph}$ proportional to intensity of the light impinging on element 101. Photo-signal converter 103 accepts $I_{ph}$ as input and provides two outputs (out1 and out2). The first output (out1) may output a current signal linearly proportional to the intensity of light impinging on the photosensitive element. The second output (out2) may output a voltage signal logarithmic with the intensity of light impinging on the photosensitive element.

As further depicted in FIG. 1, the second output (out2) may be received by detector 105. Detector 105 may be configured to generate, autonomously and independently of detectors of other pixels, a trigger signal when a signal of the detector proportional to the voltage signal of the second output of photo-signal converter 103 exceeds a threshold. In some embodiments, the signal of the detector may comprise a voltage signal or a current signal. In still further embodiments, the detector is configured to generate a trigger signal in response to detecting a predefined condition of the second output of the photo-signal converter. As shown in FIG. 1, detector 105 may send the trigger signal to light-to-time converter 107. Further, detector 105 may reset after light-to-time converter 107 sends a control signal to detector 105.

As further depicted in FIG. 1, the first output (out1) may be received by light-to-time converter 107. Light-to-time converter 107 may be configured to measure and encode, in the time domain, light intensity on the photosensitive element. For example, light-to-time converter 107 may encode the light intensity in the time between the trigger signal and a time at which a voltage across a capacitor of the light-to-time converter 107 reaches a reference voltage. In certain aspects, light-to-time converter 107 may change the reference voltage during the encoding. Accordingly, light-to-time converter may encode the light intensity in the time between the trigger signal and a plurality of times at which the voltage across the capacitor of the light-to-time converter 107 reaches corresponding reference voltages.

As further depicted in FIG. 1, light-to-time converter 107 may send the encoded intensity to a readout circuit 109. For example, light-to-time converter 107 may send the trigger signal and a completion signal (or a plurality of completion signals in embodiments where the reference voltage is changed) to readout circuit 109. Readout circuit 109, as shown in FIG. 1, may be external to pixel 100. In some embodiments, readout circuit 109 may comprise an AER-based circuit (see, e.g., FIG. 2B).

Figure 2A:
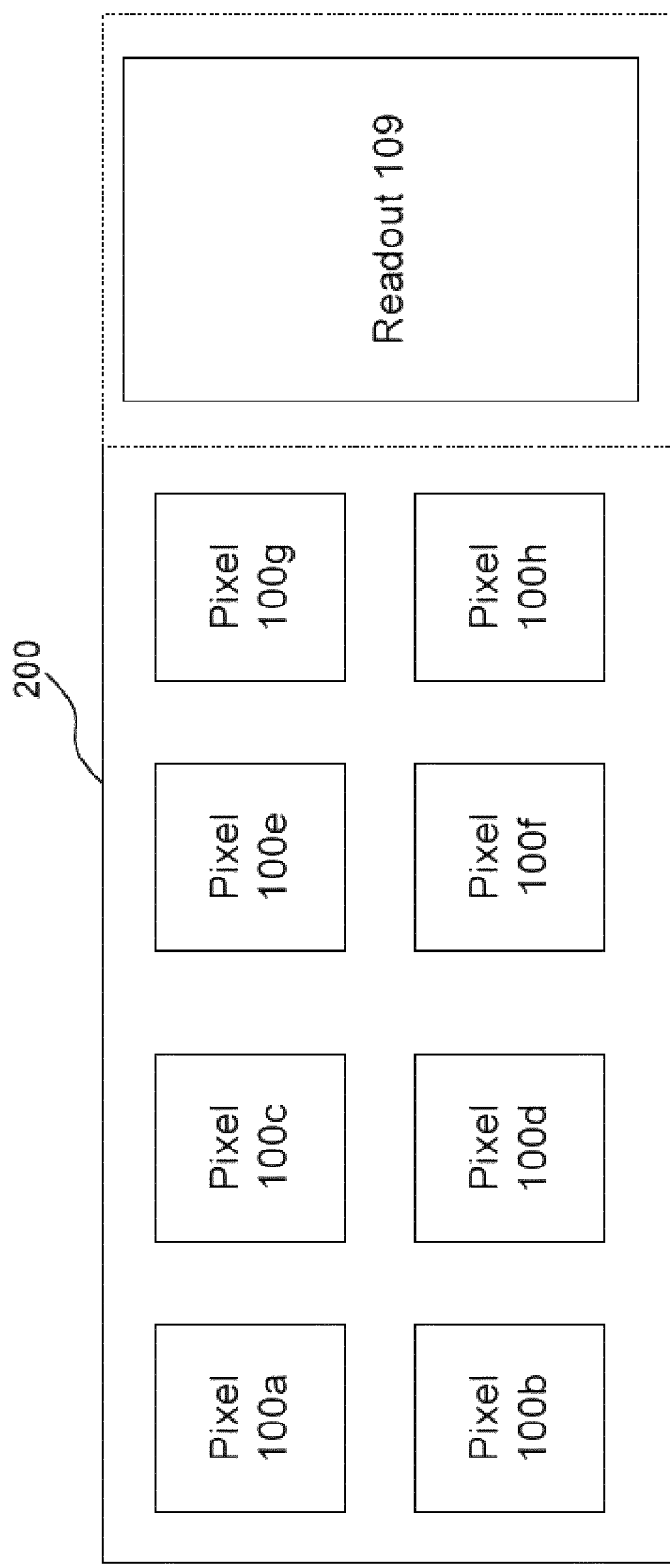
FIG. 2A is a schematic representation of an exemplary image sensor including a plurality of pixels of FIG. 1, according to embodiments of the present disclosure.

FIG. 2A is a schematic representation of an image sensor 200 that includes a plurality of pixels. For example, each pixel in sensor 200 may comprise pixel 100 of FIG. 1. In FIG. 2A, image sensor 200 is depicted as having pixels 100a, 100b, 100c, 100d, 100e, 100f, 100g, and 100h. Although depicted with eight pixels (100a-100h), any number of pixels may be used in image sensor 200. Moreover, although depicted as being arranged in a rectangular array, the pixels of image sensor 200 may be arranged in any suitable shape, such as a square, a rhombus, a parallelogram, a rectangle, a circle, an ellipse, or the like.

As further depicted in FIG. 2A, readout 109 may be implemented as a readout circuit that is external to pixels 100a, 100b, 100c, 100d, 100e, 100f, 100g, and 100h, yet still forming a portion of sensor 200. In an alternative embodiment (not depicted), readout 109 may be external to sensor 200 as well as to pixels 100a, 100b, 100c, 100d, 100e, 100f, 100g, and 100h.

Figure 2B:
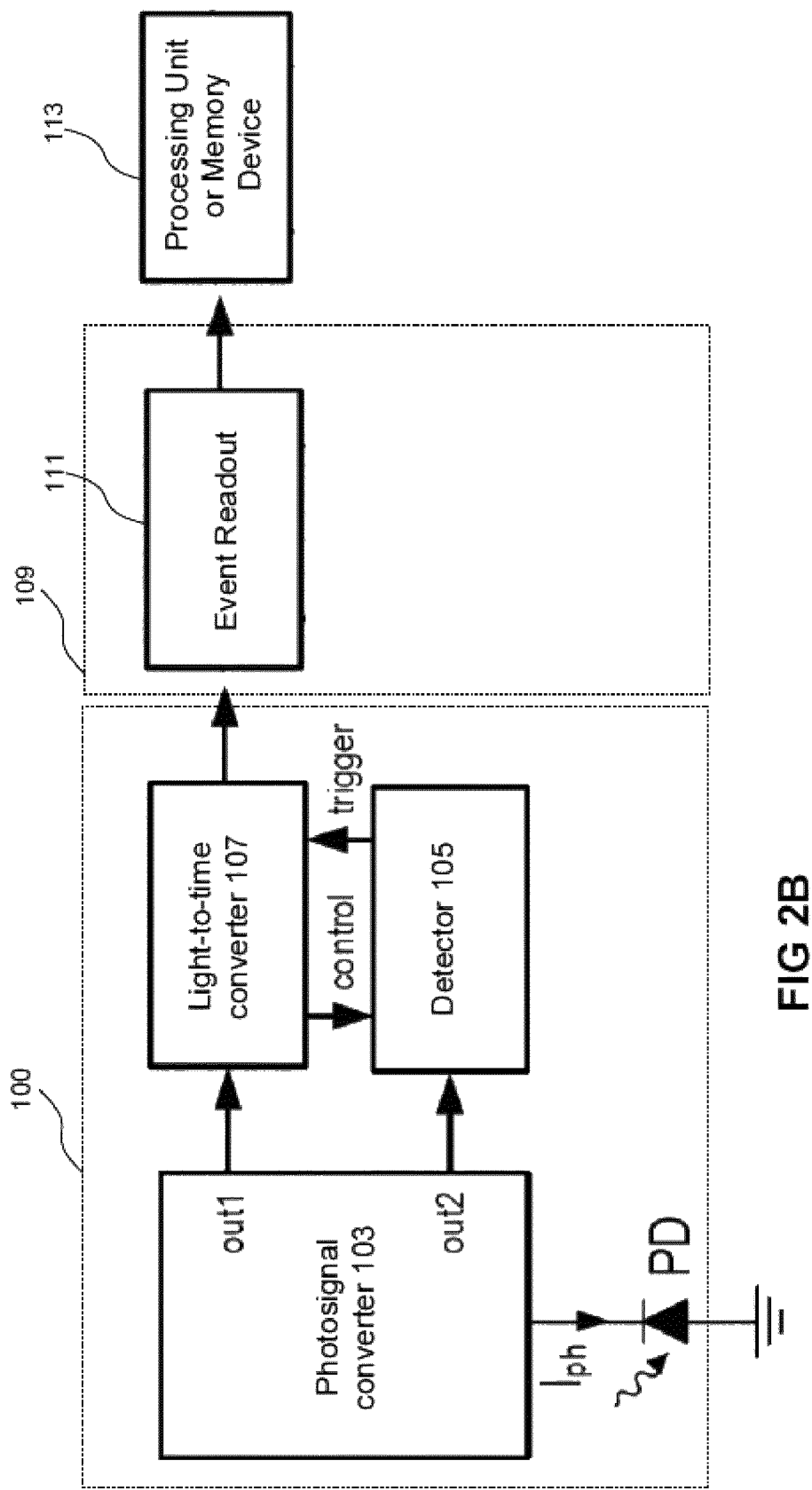
FIG. 2B is a schematic representation of an exemplary pixel of FIG. 1 with an event readout circuit, according to embodiments of the present disclosure.

FIG. 2B is a schematic representation of exemplary pixel 100 with an event readout circuit 111. Pixel 100 of FIG. 2B includes photodiode PD (similar to photosensitive element 101 of FIG. 1), photo-signal converter 103 including two outputs (out1 and out2), detector 105, and light-to-time converter 107. As further depicted in FIG. 2B, light-to-time converter 107 sends signals to circuit 111, which may be external to pixel 100. In the example of FIG. 2B, circuit 111 is an event readout circuit configured to communicate with each of a plurality of pixels, e.g., using a conventional AER protocol. Accordingly, circuit 111 may read out the times of pulses (or pulse edges) from pixel 100 along with times from other light-to-time converters of other pixels (not shown). Moreover, circuit 111 may forward the read out times to a processing unit or a memory device 113. As depicted in FIG. 2B, processing unit or memory 113 may be external to pixel 100 and to circuit 111 and may also be external to the sensor.

By using an AER protocol for circuit 111, each pixel in an array may individually and autonomously request access to output signals at any point in time if the pixel has an event to communicate. Such an event may be, for example, the start or the end of a light-to-time conversion. Circuit 111 may add the requesting pixel's address (e.g., a location in the array encoding in coordinates) and a timestamp to the event identifier received from the pixel. Circuit 111 may then transmit a resulting data packet including the address, timestamp, and event via a digital bus to a processing unit or a memory device (e.g., 113 in FIG. 2B) and return an acknowledge signal to the requesting pixel.

As described above, circuit 111 may be shared between all pixels, e.g., based on row- and column-wise request and acknowledge lines. In the unlikely event of a collision of requests from pixels, access to circuit 111 may be arbitrated by circuitry (not shown) that queues the requests to avoid a collision and subsequent loss of data.

Figure 3:
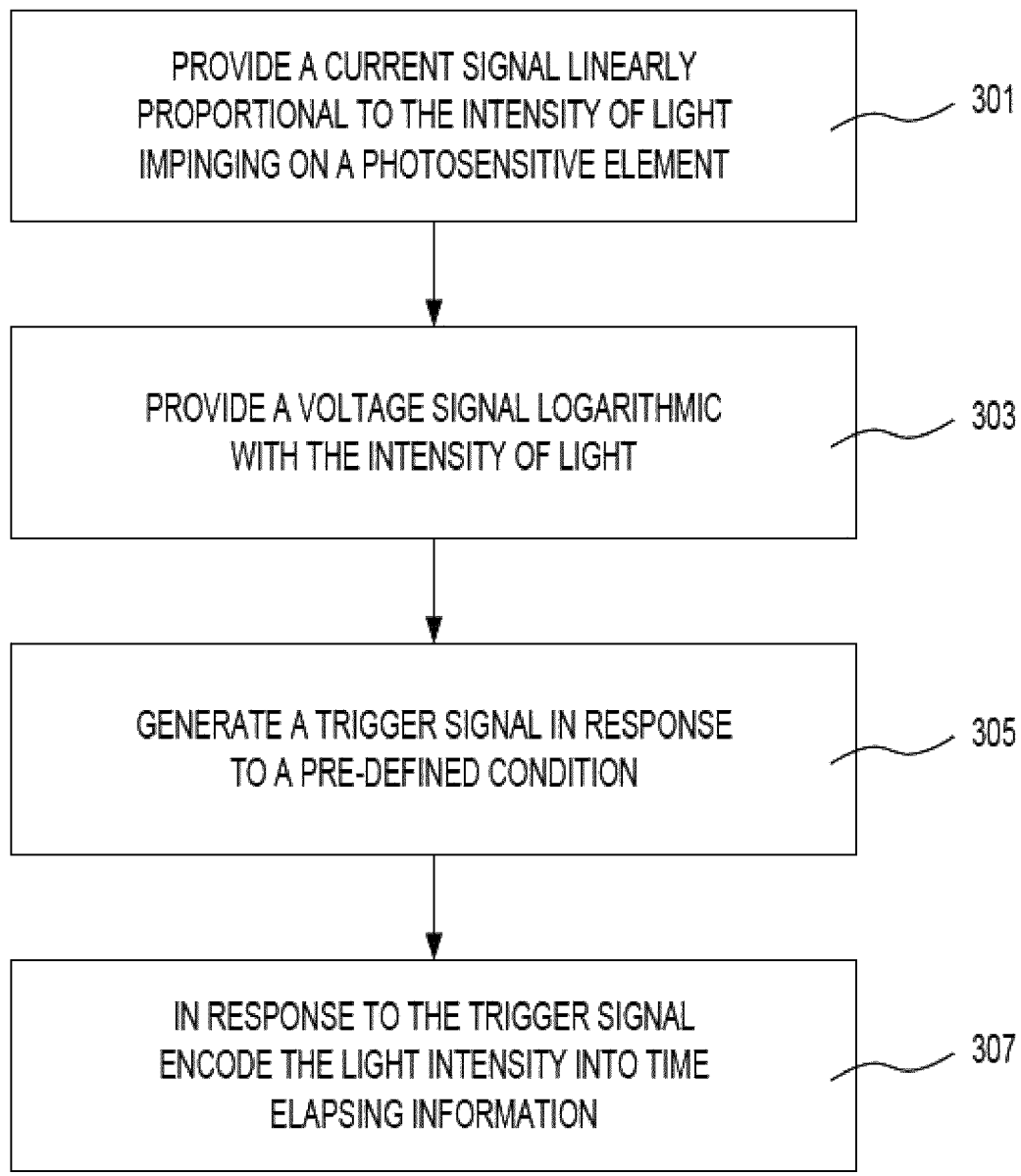
FIG. 3 is a flowchart of an exemplary method for time-based image sensing, according to embodiments of the present disclosure.

FIG. 3 is a flowchart of an exemplary method 300 for time-based image sensing, e.g., using pixel 100 of FIG. 1. At step 301 in FIG. 3, the pixel may provide, at a first output of a photo-signal converter, a current signal that is linearly proportional to the intensity of light impinging on the photosensitive element. For example, the pixel may include photo-signal converter 700 of FIG. 7 and/or photo-signal converter 800 of FIG. 8. The first output may be equal to current $I_{ph}$ from the photosensitive element or may comprise another current linearly proportional to the intensity of light impinging on the photosensitive element. For example, photo-signal converter 700 may include a gain such that it outputs a larger current than $I_{ph}$ that is still linearly proportional to the intensity of light impinging on the photosensitive element.

At step 303, the pixel may provide, at a second output of the photo-signal converter, a voltage signal that is logarithmic with the intensity of light impinging on the photosensitive element. For example, the pixel may include photo-signal converter 700 of FIG. 7 and/or photo-signal converter 800 of FIG. 8. The second output may comprise a voltage that is logarithmic with current $I_{ph}$, optionally with a constant minimum (see Equation 1, below).

The steps of method 300 may be implemented in various ways. For example, in some embodiments, steps 301 and 303 may be overlapping or otherwise concurrent. For instance, the signal converter may provide both the first output and the second output on a continuous basis.

At step 305, the pixel may generate with the detector, and autonomously and independently of detectors of other pixels, a trigger signal when a signal of the detector proportional to the voltage signal of the second output of the photo-signal converter exceeds a threshold. For example, the detector may comprise detector 500 of FIG. 5. The detector may trigger when a signal proportional to the voltage of the second output increases above (or decreases below) the threshold. Accordingly, the detector may trigger whenever the magnitude of the voltage signal exceeds a threshold, thereby capturing both increases in intensity and decrease in intensity. Further, as disclosed herein, more than one threshold may be used as part of this step.

At step 307, the pixel may encode, with the light-to-time converter, light intensity on the photosensitive element into time elapsing information, the time elapsing information comprising an initiation time of a light-to-time conversion cycle and a completion time of the light-to-time conversion cycle. For example, the detector may comprise light-to-time converter 700 of FIG. 7 and/or light-to-time converter 800 of FIG. 8. In some embodiments, the light-to-time conversion cycle may be initiated by the light-to-time converter in response to receipt of the trigger signal from the detector. Additionally or alternatively, the light-to-time conversion cycle may be initiated externally. For example, the light-to-time conversion cycle may be run at predetermined time intervals. In another example, the light-to-time conversion cycle may be initiated externally for a pixel if external circuitry (e.g., a logic circuit) determines that the pixel has not run a light-to-time conversion in a specific period of time. Accordingly, in some embodiments, the pixel may initiate the light-to-time conversion cycle based on trigger signals from the detector and, when no trigger signals from the detector occur after the specific period of time, based on an external trigger.

Figure 7:
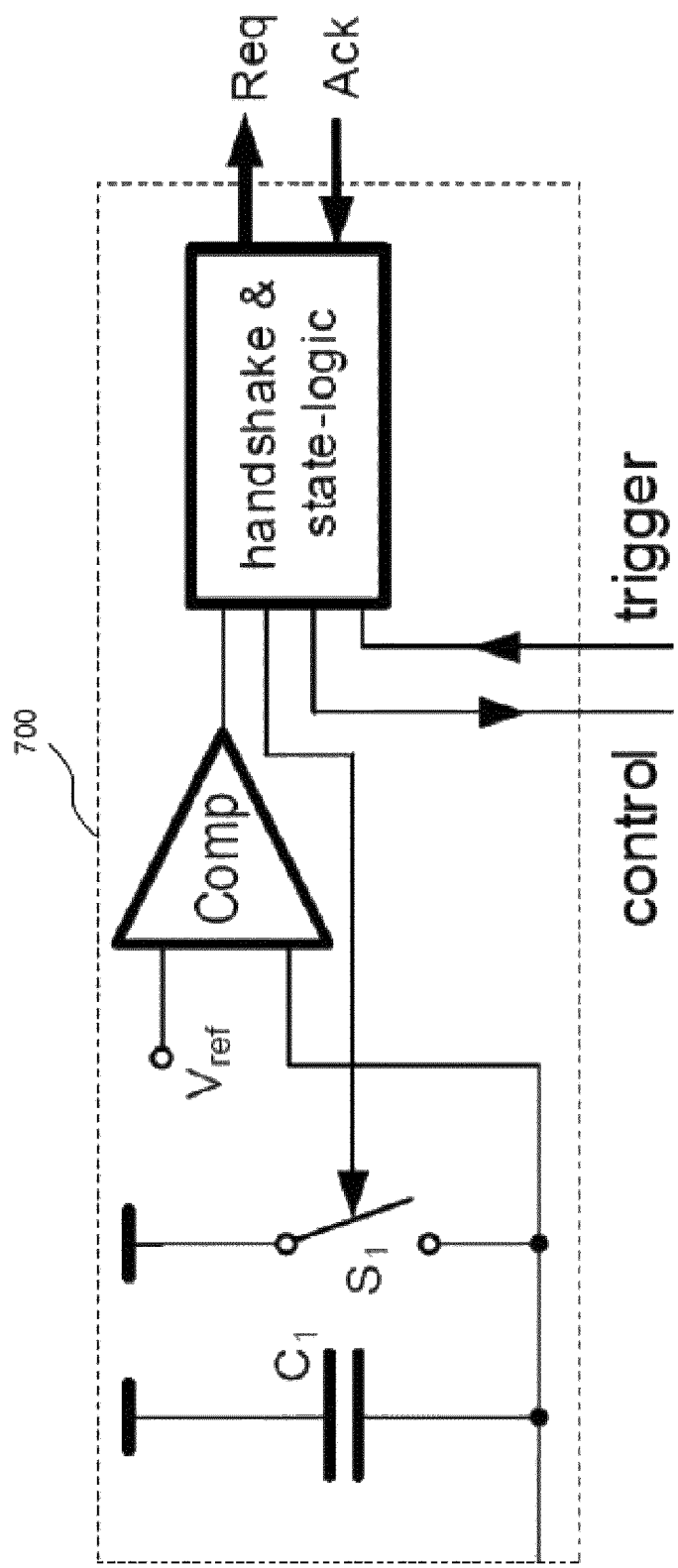
FIG. 7 is a schematic representation of an exemplary light-to-time converter, according to embodiments of the present disclosure.
Figure 8:
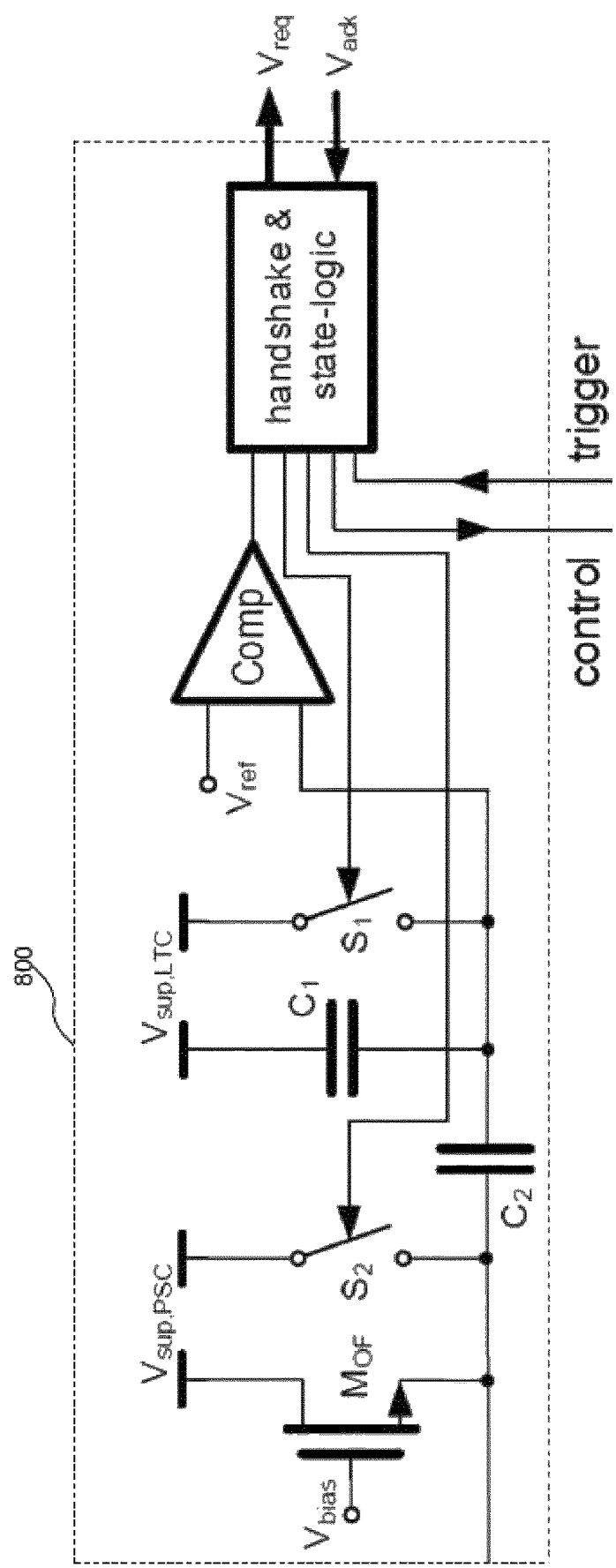
FIG. 8 is a schematic representation of another exemplary light-to-time converter, according to embodiments of the present disclosure.

The example method 300 may include additional steps. For example, in some embodiments, method 300 may include communicating, with the light-to-time converter, the initiation time of the light-to-time conversion cycle to a readout circuit or system that is external to the plurality of pixels. Further, method 300 may include communicating, with the light-to-time converter, the completion time of the light-to-time conversion cycle to the readout circuit or system. For example, the light-to-time converter may communicate the initiation time and the completion time via a Req bus, as depicted in FIGS. 7 and 8.

In embodiments having a readout system, method 300 may further include combining, at the readout system, address information for each pixel with the light-to-time conversion cycle initiation and completion information received from the light-to-time converter of the respective pixel. In such embodiments, method 300 may further include synchronizing and time-stamping the pixel address information and the light-to-time conversion cycle initiation and completion information by a digital processing system external to the plurality of pixels. As explained above with reference to FIG. 2A, the digital processing system may comprise at least a portion of readout circuitry 109 and therefore form a portion of an image sensor although external to the pixels. Alternatively, the digital processing system may be external to the image sensor as well as the pixels.

Additionally or alternatively, method 300 may include charging, during the light-to-time conversion cycle, a capacitor using the current signal of the first output of the photo-signal converter, and detecting, with a comparator, the completion time of the light-to-time conversion cycle when it is determined that a voltage across the capacitor has reached a reference voltage. For example, a logic circuit of the light-to-time converter may determine the completion time based on receipt of the signal from the comparator that the reference voltage has been reached. In some embodiments, method 300 may further include varying the reference voltage between a plurality of reference voltage levels. For example, method 300 may further include increasing or decreasing the reference voltage to a greater or lesser, respectively, reference voltage level each time the voltage across the capacitor reaches the reference voltage. Accordingly, the light-to-time converter may send a plurality of completion times through the Req bus, each having an associated reference voltage.

The above-described additional measurements may allow for measurement smoothing and error correction. For example, the completion times may be used to calculate a plurality of intensity measurements, from which a mean, median, or other statistical value may be extracted as the "actual" intensity measurement. In such an example, the completion times may be further used to calculate an estimated rate of error (or confidence range) of the "actual" intensity measurement. Additionally or alternatively, the completion times may first be smoothed or otherwise statistically collated such that an "actual" completion time is calculated (with an associated reference voltage). In such an example, the completion times may be further used to calculate an estimated rate of error (or confidence range) of the "actual" completion time.

Furthermore, the use of at least two thresholds may allow for time-domain correlated double sampling. Such sampling may reduce noise due to resets in the light-to-time converter and reduce offset errors in the comparator.

In some embodiments, method 300 may further include initiating the light-to-time conversion cycle by opening a switch in parallel with a capacitor. In such embodiments, method 300 may further include closing the switch to discharge the capacitor before opening the switch to initiate the light-to-time conversion cycle. The switch may connect the capacitor to a ground (or constant voltage supply) and therefore discharge the capacitor.

In still further embodiments, method 300 may include sending a reset signal to the detector in response to receipt of the trigger signal from the detector. For example, a logic circuit of the light-to-time converter may send a control signal to the detector such that the detector resets and prepares to detect another triggering event (i.e., change in voltage).

In some embodiments, method 300 may include, when another trigger signal is received before completion of a current light-to-time conversion cycle, resetting and initiating a new light-to-time conversion cycle. For example, the light-to-time converter may send a control signal to the detector such that the detector resets, begin the light-to-time conversion, and receive another trigger signal from the detector before the light-to-time conversion has completed (e.g., before the comparator has sent a signal indicating one or more reference voltages has been reached). Accordingly, the light-to-time converter may discharge the capacitor and begin a new light-to-time conversion based on the new trigger signal. In such embodiments, the light-to-time converter may further send a signal indicating that the previous conversion was abandoned via the Req bus.

Figure 4A:
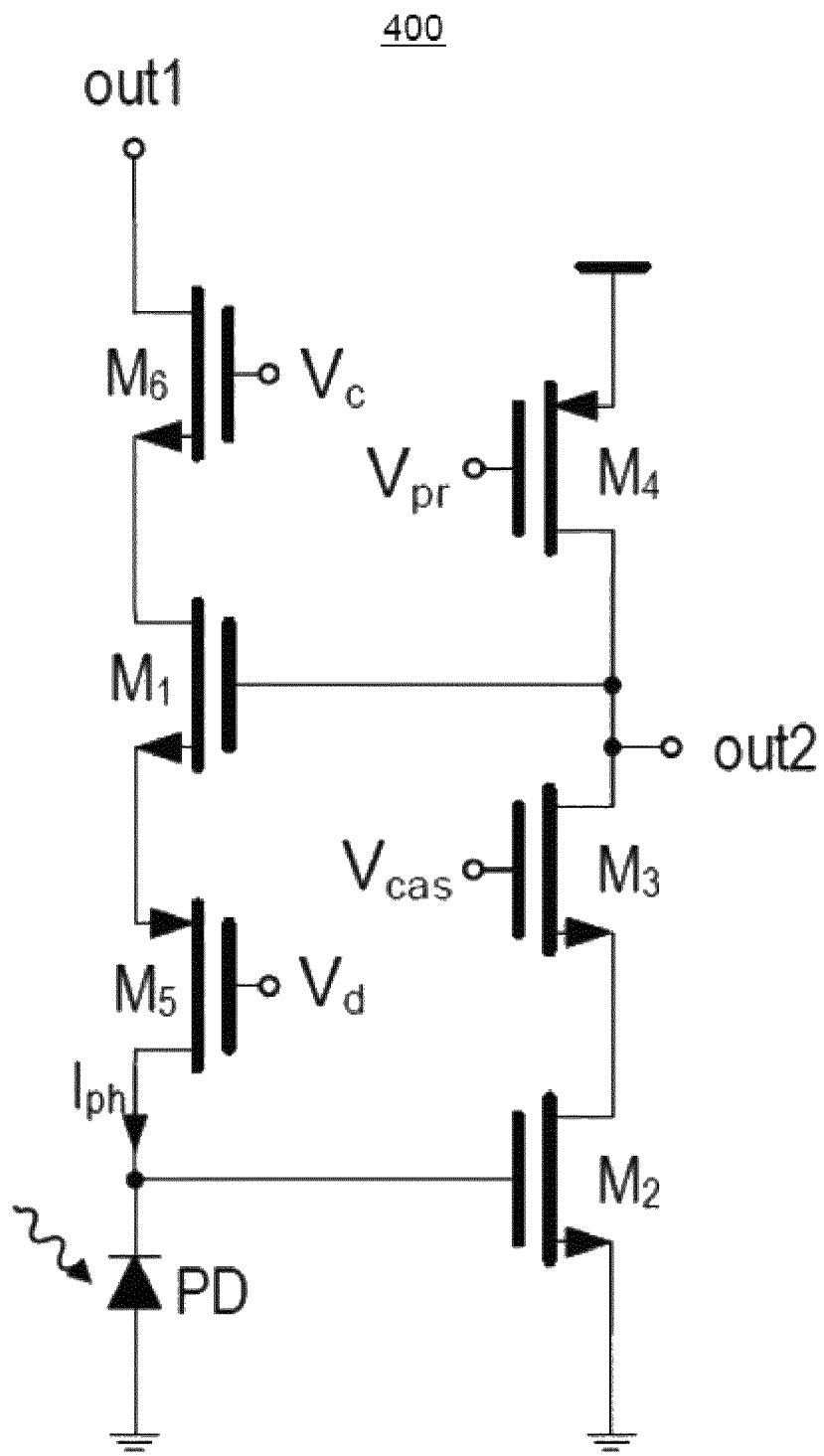
FIG. 4A is a schematic representation of an exemplary photo-signal converter, according to embodiments of the present disclosure.

FIG. 4A is a schematic representation of a photo-signal converter 400. Photo-signal converter 400 may be used in pixel 100 of FIG. 1 (see photo-signal converter 103).

As depicted in FIG. 4A, converter 400 may include a transistor M1 having a drain, a source, and a gate. The gate may be connected to the second output (out2) of the converter 400. Converter 400 may further include a transistor M5 having a drain, a source, and a gate. The source may be connected to photodiode PD (i.e., the photosensitive element), and the gate may be biased by voltage $V_d$. Transistor M1 and M5 may have a common source.

As further depicted in FIG. 4A, converter 400 may include a second transistor M2 having a drain, a source, and a gate. The gate may be connected to photodiode PD and the drain of transistor M5, the source may be grounded (e.g., connected to a low supply voltage), and the drain may be connected to the source of transistor M3. Transistor M3 also has a drain, a source, and a gate. The gate may be biased by voltage $V_{cas}$, and the drain may be connected out2 (and thus also to the gate of M1). The drain of M3 is further connected to the drain of transistor M4. The gate of M4 may be biased by voltage $V_{pr}$, and the source may be connected to a supply voltage (not labeled).

Transistors M1, M2, and M3 may be n-type transistors while transistors M4 and M5 may be p-type transistors. As further depicted in FIG. 4A, the drain of transistor M1 may be connected to the source of transistor M6. The gate of transistor M6 may be biased by voltage $V_c$, and the drain of transistor M6 may be connected to the first output (out1) of converter 400.

Figure 4B:
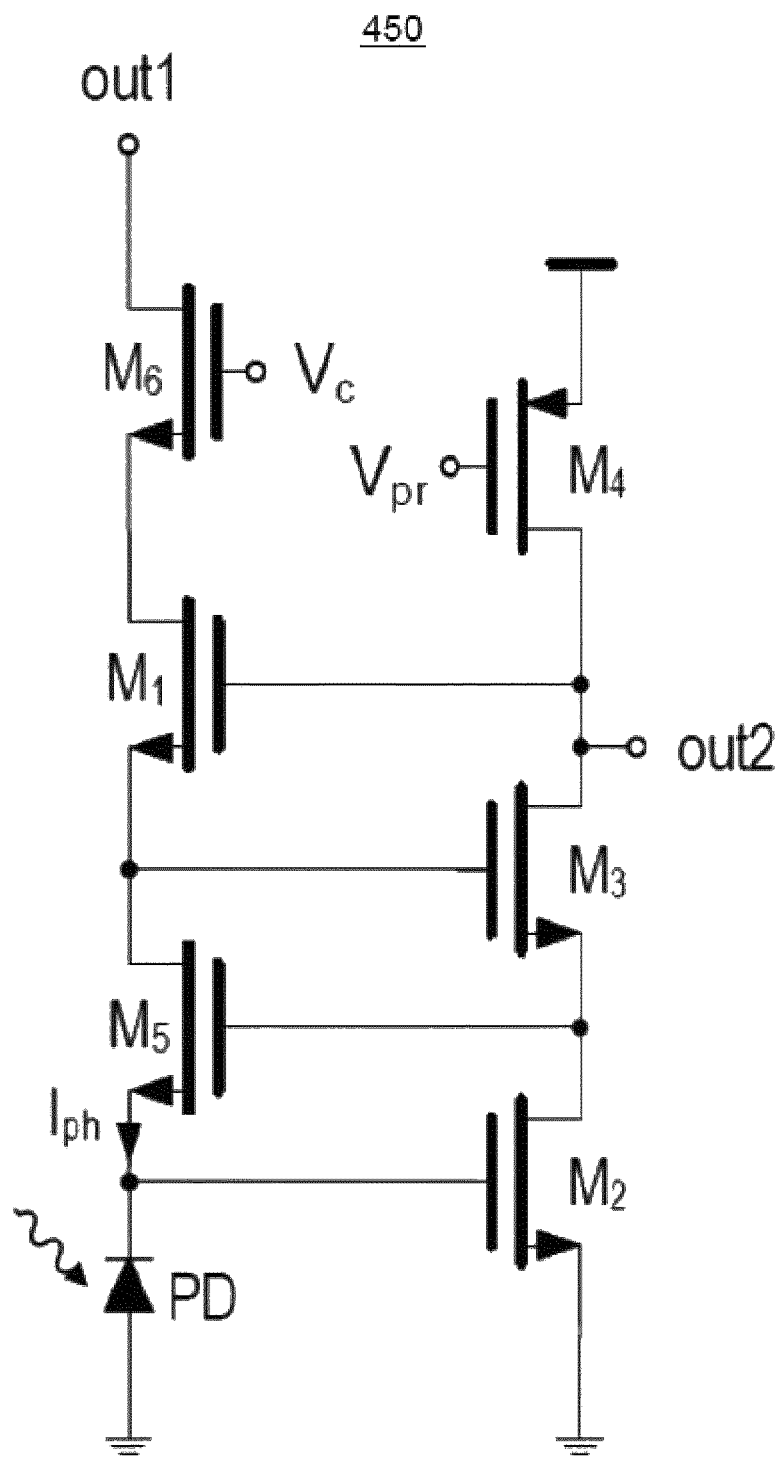
FIG. 4B is a schematic representation of another exemplary photo-signal converter, according to embodiments of the present disclosure.

FIG. 4B is a schematic representation of another photo-signal converter 450. Photo-signal converter 450 may be used in addition to or in lieu of photo-signal converter 400 in pixel 100 of FIG. 1, for example.

As depicted in FIG. 4B, converter 450 may include a transistor M1 having a drain, a source, and a gate. The gate may be connected to the second output (out2) of the converter 450. Converter 450 may further include a transistor M5 having a drain, a source, and a gate. The source may be connected to photodiode PD (i.e., the photosensitive element), and the gate may be connected to the drain of transistor M2.

Transistor M2 also has a drain, a source, and a gate. The gate may be connected to photodiode PD and the source of transistor M5, the source may be grounded (e.g., connected to a low supply voltage), and the drain may be connected to the source of transistor M3 (and thus also to the gate of transistor M5). Transistor M3 also has a drain, a source, and a gate. The gate may connected to the drain of transistor M5 (and thus also to the source of M1), and the drain may be connected out2 (and thus also to the gate of M1). The drain of M3 may be further connected to the drain of transistor M4. The gate of M4 may be biased by voltage $V_{pr}$, and the source may be connected to a supply voltage (not labeled).

Transistors M1, M2, and M3 may be n-type transistors while transistor M4 may be a p-type transistor. In the embodiment of FIG. 4A, M5 may be a p-type transistor while, in the embodiment of FIG. 4B, M5 may be an n-type transistor. As further depicted in FIG. 4A, the drain of transistor M1 may be connected to the source of transistor M6. The gate of transistor M6 may be biased by voltage $V_c$, and the drain of transistor M6 may be connected to the first output (out1) of converter 400.

The second output of photo-signal converter 400 and photo-signal converter 450 may be logarithmic with the intensity of light impinging on a photosensitive element according to Equation 1 below:

$$V_{log} = V_{DC} + A_v U_T \ln(I_{ph})$$ Equation 1

In the example of Equation 1, $V_{log}$ is the voltage logarithmically proportional to the intensity of the impinging light, $V_{DC}$ is a light-independent direct current voltage level, $A_v$ is a voltage gain factor, $U_T$ is thermal voltage, and $I_{ph}$ is the current output by the photosensitive element.

In photo-signal converter 400, $V_{log}$ may follow Equation 2 below:

$$V_{log} = n_{M1} U_T \ln\left(\frac{L_{M1}}{W_{M1}} \frac{I_{ph}}{I_{0,M1}}\right) + n_{M5} U_T \ln\left(\frac{L_{M5}}{W_{M5}} \frac{I_{ph}}{I_{0,M5}}\right) + V_d$$ Equation 2

In the example of Equation 2, $V_{log}$ is the voltage logarithmically proportional to the intensity of the impinging light, $U_T$ is thermal voltage, $n_{M1}$ is the sub-threshold slope factor for transistor M1, $n_{M5}$ is the sub-threshold slope factor for transistor M5, $L_{M1}$ is the channel length of transistor M1, $L_{M5}$ is the channel length of transistor M5, $W_{M1}$ is the channel width of transistor M1, $W_{M5}$ is the channel width of transistor M5, $I_{0,M1}$ is the sub-threshold saturation current of transistor M1, $I_{0,M5}$ is the sub-threshold saturation current of transistor M5, $V_d$ is the bias voltage applied to transistor M5, and $I_{ph}$ is the current output by the photosensitive element.

Accordingly, a change in photocurrent from $I_{ph1}$ to $I_{ph2}$ (caused by a change of intensity of impinging light), generates a $\Delta V_{log}$ that may follow Equation 3 below:

$$\Delta V_{log} = n_{M1} U_T \ln\left(\frac{I_{ph1}}{I_{ph2}}\right) + n_{M5} U_T \ln\left(\frac{I_{ph1}}{I_{ph2}}\right)$$ Equation 3

On the other hand, in photo-signal converter 450, $V_{log}$ may follow Equation 4 below:

$$V_{log} = n_{M1} U_T \ln\left(\frac{L_{M1}}{W_{M1}} \frac{I_{ph}}{I_{0,M1}}\right) - V_d$$ Equation 4

In the example of Equation 4, $V_{log}$ is the voltage logarithmically proportional to the intensity of the impinging light, $U_T$ is thermal voltage, $n_{M1}$ is the sub-threshold slope factor for transistor M1, $L_{M1}$ is the channel length of transistor M1, $W_{M1}$ is the channel width of transistor M1, $I_{0,M1}$ is the sub-threshold saturation current of transistor M1, $V_d$ is the reverse voltage across the photosensitive element PD, and $I_{ph}$ is the current output by the photosensitive element.

Accordingly, a change in photocurrent from $I_{ph1}$ to $I_{ph2}$ (caused by a change of intensity of impinging light), generates a $\Delta V_{log}$ that may follow Equation 5 below:

$$\Delta V_{log} = n_{M1} U_T \ln\left(\frac{I_{ph1}}{I_{ph2}}\right)$$ Equation 5

Therefore, photo-signal converter 450 may be easier and less costly to fabricate than photo-signal converter 400, but photo-signal converter 400 may produce more gain than photo-signal converter 450.

Figure 5:
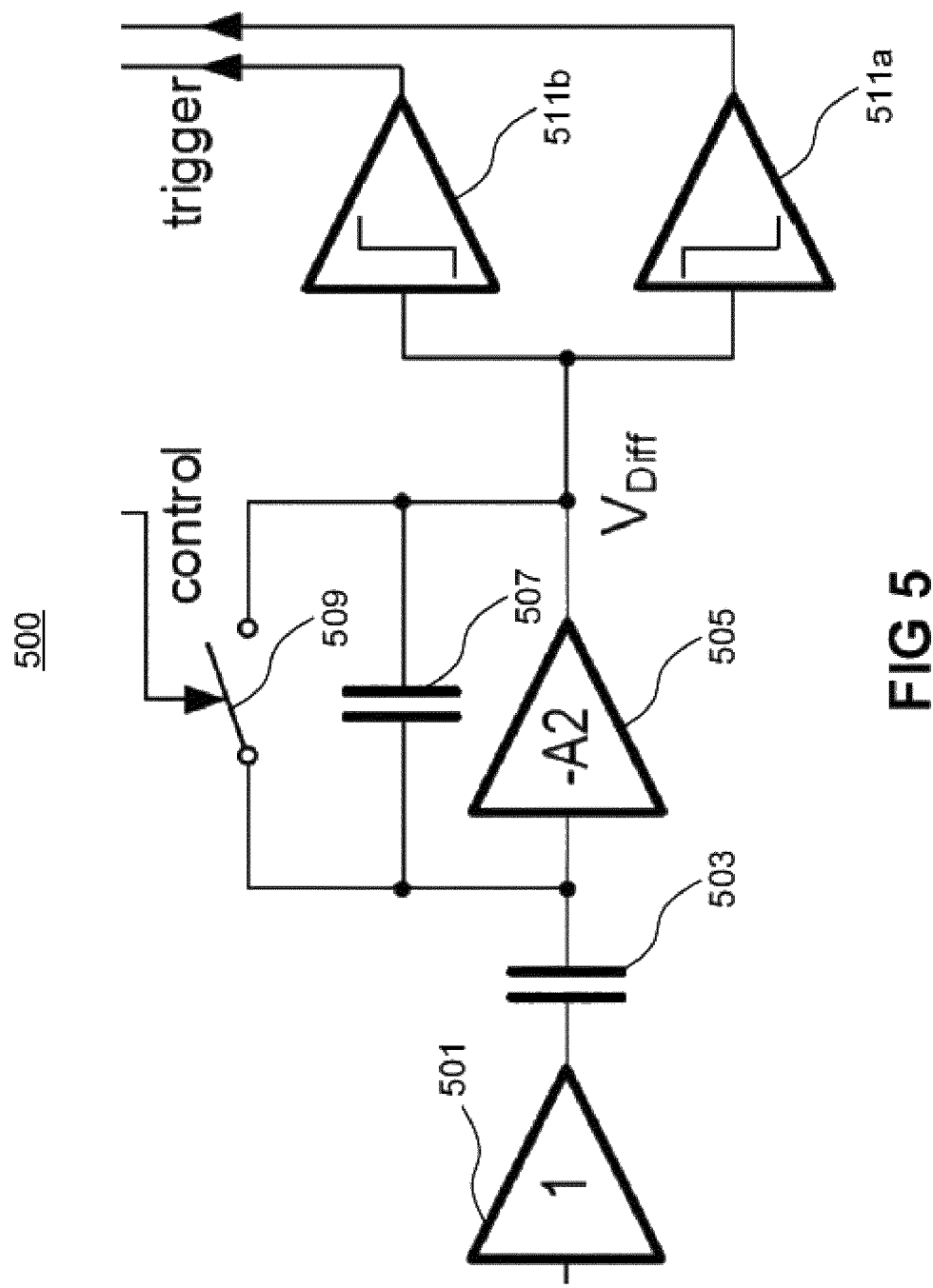
FIG. 5 is a schematic representation of an exemplary detector, according to embodiments of the present disclosure.

FIG. 5 is a schematic representation of an exemplary detector 500. Detector 500 may be used in pixel 100 of FIG. 1 (see detector 105). As depicted in FIG. 5, detector 500 includes an amplifier 501 connected to the second output of the photo-signal converter (not shown). Amplifier 501 may be a unity gain amplifier. In some embodiments, amplifier 501 may be inverting. Capacitor 503 may be connected to amplifier 501.

Detector 500 may further include amplifier 505, capacitor 507, and switch 509 connected in parallel to a common node with capacitor 503. Accordingly, whenever detector 500 receives a control signal (e.g., a confirmation signal from a logic circuit of a light-to-time converter), switch 509 may close to short-circuit detector 500 and prepare for a new detection.

Amplifier 505 (which may be an inverting amplifier) amplifies changes in the voltage from capacitor 503 such that these changes are deviations from a defined voltage level (that is, the level of voltage at capacitor 503 at a previous reset signal) at $V_{diff}$. Whenever $V_{diff}$ crosses a threshold in a negative direction, amplifier 511a sends a trigger signal to the light-to-time converter. Similarly, whenever $V_{diff}$ crosses a threshold (which may be the same threshold as above or a different threshold) in a positive direction, amplifier 511b sends a trigger signal to the light-to-time converter. Accordingly, detector 500 may detect increases in intensity above one threshold as well as decreases in intensity below the same or a different threshold.

By using detector 500, pixel 100 may be configured such that, instead of obtaining synchronous pixel information at fixed time steps δt, pixel 100 obtains asynchronous pixel information at light increments given by Equation 6 below:

$$\theta_{ev} = \left|\ln\left(\frac{I_{ph}(t_2)}{I_{ph}(t_1)}\right)\right| \approx \left|\frac{\Delta I_{ph}}{I_{ph}}\right|$$ Equation 6

In the example of Equation 6, $\theta_{ev}$ is the minimum detectable temporal contrast (also termed "contrast sensitivity") and $I_{ph}$ is the current output by the photosensitive element. Noise may further limit the contrast sensitivity of an asynchronous pixel of the present disclosure.

Although described with reference to detector 500 of FIG. 5, any suitable detector may be used that is adapted to analyze a signal (e.g., a voltage signal or a current signal) of the detector with reference to the second output of the photo-signal converter or, more generally, to detect one or more predefined conditions of the second output of the photo-signal converter. Furthermore, any combination of transistors, capacitors, switches, and/or other circuit components arranged to perform such an analysis may be used for the detector in each pixel, consistent with the present disclosure.

Figure 6:
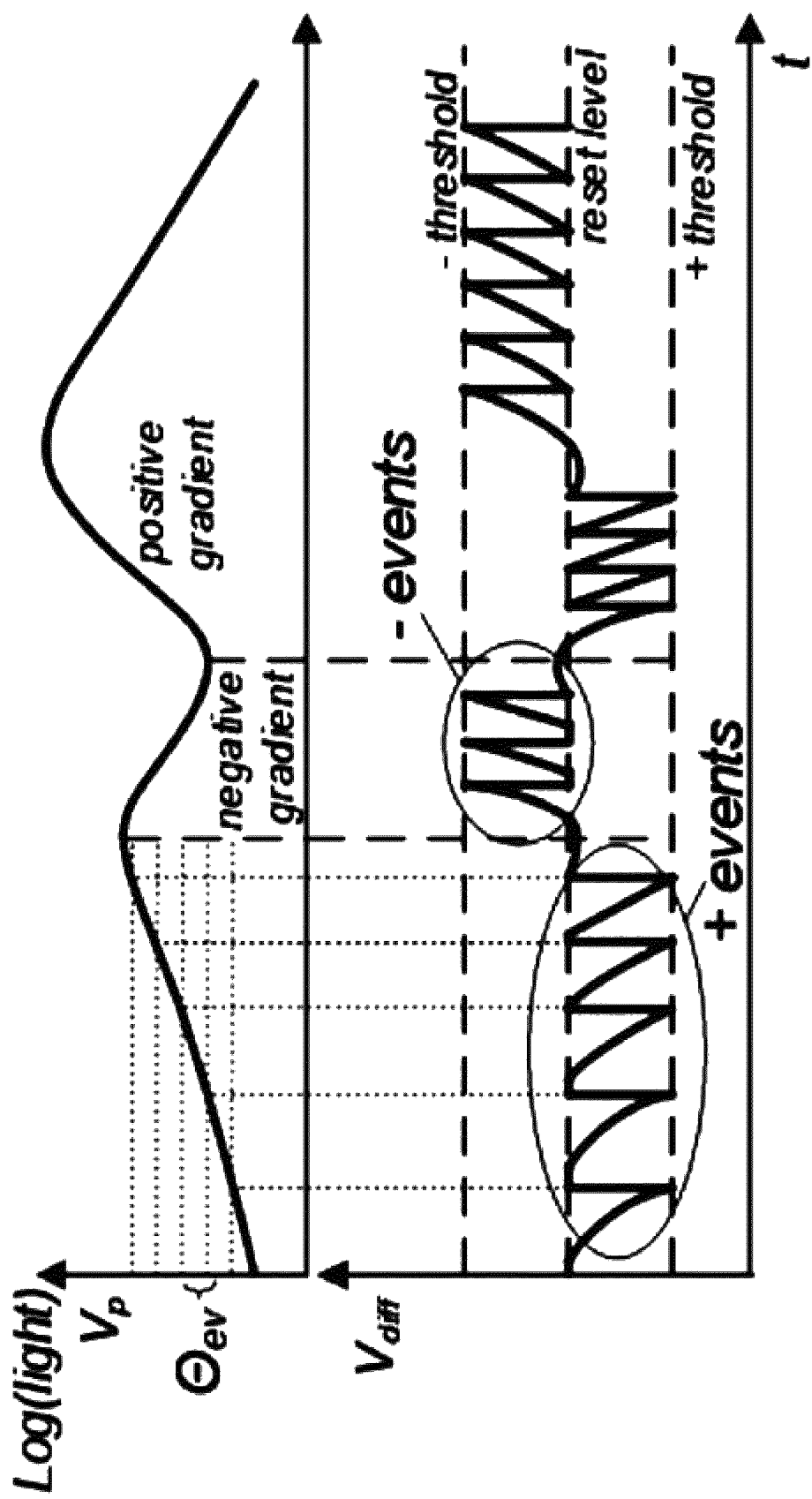
FIG. 6 is a graphical illustration of triggers generated by the detector of FIG. 5, according to embodiments of the present disclosure.

FIG. 6 is a graphical illustration of triggers generated by detector 500 of FIG. 5. In FIG. 6, $V_p$ represents the voltage at capacitor 503 of detector 500 and, thus, is a voltage proportional to the output from the second output of the photo-signal converter. Furthermore, $V_{diff}$ is a voltage signal of detector 500 that is an inverted and amplified version of $V_p$ and, therefore, proportional to the output from the second output of the photo-signal converter. As further depicted in FIG. 6, both increases in $V_p$ (depicted as "+ events") and decreases in $V_p$ (depicted as "− events") may cause a trigger signal to be generated. Because $V_{diff}$ is an inverted and amplified version of $V_P$, increases in $V_P$ appear as decreases in $V_{diff}$ and vice versa. In addition, FIG. 6 illustrates how a "+ threshold" may be set to the same (in magnitude) as the "− threshold" but may also be set to be different. Finally, FIG. 6 illustrates how $V_{diff}$ is reset to a baseline (depicted as "reset level") after each trigger (e.g., by closing switch 509).

FIG. 7 is a schematic representation of an exemplary light-to-time converter 700. Converter 700 may be used in pixel 100 of FIG. 1 (see converter 107).

As depicted in FIG. 7, converter 700 may include a capacitor C1, a switch S1, and a comparator (having reference voltage $V_{ref}$). These elements may be connected to the first output of the photo-signal converter (not shown). Accordingly, whenever switch S1 is opened, capacitor C1 charges due to the current from the first output. When the voltage across C1 reaches $V_{ref}$, the comparator may generate a completion signal.

As further depicted in FIG. 7, handshake and state-logic (i.e., a logic circuit of converter 700) may open switch S1 upon receipt of a trigger signal from a detector. In addition, handshake and state-logic may send a control signal to the detector, confirming receipt of the trigger signal. As further depicted in FIG. 7, handshake and state-logic may send the trigger signal and the completion signal from the comparator to a readout circuit (not shown) via Req bus. In some embodiments, handshake and state-logic may also receive acknowledgment signals from the readout circuit via Ack bus. Although not depicted, handshake and state-logic may also close S1 to discharge capacitor C1 to prepare for a light-to-time conversion (e.g., before or at receipt of the trigger signal).

Although not depicted in FIG. 7, handshake and state-logic may change $V_{ref}$ throughout the light-to-time conversion. Accordingly, a plurality of completion times may be obtained and output via the Req bus. As explained above, the use of a plurality of measurements may allow for smoothing and/or error correction.

Accordingly, light-to-time converter 700 may encode the intensity of light impinging on a photosensitive element within a time according to Equation 7 below:

$$t_{int} = \frac{C_1}{I_{ph}}(V_{start} - V_{ref})$$ Equation 7

In the example of Equation 7, $t_{int}$ is the time into which the light intensity is encoded, $C_1$ is the capacitance of capacitor C1, $I_{ph}$ is the current output by the photosensitive element (or the current received by light-to-time converter 700 from the first output of the photo-signal converter), $V_{start}$ is a constant voltage connected to an upper plate of capacitor C1 (e.g., at the receipt of the trigger signal), and $V_{ref}$ is the reference voltage of the comparator. $V_{start}$ is labeled as $V_{pix,0}$ in FIGS. 9A, 9B, and 9C, described below. In some embodiments, $V_{start}$ (or $V_{pix,0}$) may be equal to (or derived from) a supply voltage of the light-to-time converter (e.g., $V_{sup,LTC}$ as labelled in FIG. 8, described below) and is permanently connected to the upper plate of C1 (and upper terminal of S1).

FIG. 8 is a schematic representation of another exemplary light-to-time converter 800. Converter 800 may be used in addition to or in lieu of converter 700 in pixel 100 of FIG. 1.

As depicted in FIG. 8, converter 800 may include a capacitor C1, a switch S1, and a comparator (having reference voltage $V_{ref}$). Similar to converter 700 of FIG. 7, these elements may be connected to the first output of the photo-signal converter (not shown). Accordingly, whenever switch S1 is opened, capacitor C1 charges due to the current from the first output. When the voltage across C1 reaches $V_{ref}$, the comparator may generate a completion signal. Moreover, capacitor C1 and/or switch S1 may also be connected to a supply voltage of the light-to-time converter 800, $V_{sup,LTC}$.

As further depicted in FIG. 8, converter 800 may include a capacitor C2 connected to a common node of capacitor C1, switch S1, and the comparator. Capacitor C2 may function as a coupling capacitor with C1, allowing for the use of differing supply voltages.

As further depicted in FIG. 8, handshake and state-logic (i.e., a logic circuit of converter 800) may open switch S1 upon receipt of a trigger signal from a detector. In addition, handshake and state-logic may send a control signal to the detector, confirming receipt of the trigger signal. As further depicted in FIG. 8, handshake and state-logic may send the trigger signal and the completion signal from the comparator to a readout circuit (not shown) via Req bus. In some embodiments, handshake and state-logic may also receive acknowledgment signals from the readout circuit via Ack bus. Although not depicted, handshake and state-logic may also close S1 to discharge capacitor C1 to prepare for a light-to-time conversion (e.g., before or at receipt of the trigger signal).

Although not depicted in FIG. 7, handshake and state-logic may change $V_{ref}$ throughout the light-to-time conversion. Accordingly, a plurality of completion times may be obtained and output via the Req bus. As explained above, the use of a plurality of measurements may allow for smoothing and/or error correction.

As further depicted in FIG. 8, light-to-time converter 800 may include transistor $M_{OF}$ having a source connected to the first output of the photo-signal converter, a gate biased by voltage $V_{bias}$, and a drain connected to a supply voltage of the photo-signal converter, $V_{sup,PSC}$. By incorporating transistor $M_{OF}$, light-to-time converter 800 may prevent the voltage at the first output of the photo-signal converter from dropping too low such that photo-signal converter stops delivering a voltage output proportional to the logarithm of the impinging light at the second output. Light-to-time converter 800 may also include a switch S2 (or, for example, a transistor acting as a switch) in parallel with $M_{OF}$. Thus, handshake and state-logic may control switch S2 similarly to switch S1 (that is, open switch S2 to start a light-to-time conversion cycle and/or close switch S2 to discharge and prepare for a light-to-time conversion cycle).

The $M_{OF}$ transistor of light-to-time converter 800 may be governed by Equation 9 below:

$$V_{bias} = V_{PRI,out} + V_{GS,MOF}(I_{ph,max})$$  Equation 9

In the example of Equation 9, $V_{bias}$ is the constant bias voltage applied to the $M_{OF}$ transistor and depends on $V_{PRI,out}$, which is the minimum allowable voltage at the first output of the photo-signal converter and can be derived from measuring outputs of the photo-signal converter or simulating the same. $V_{bias}$ further depends on $V_{GS,MOF}$, which is a function of $I_{ph,max}$, which is the maximal current output of the photosensitive element and can be derived from measuring outputs of the photosensitive element or calculated based on one or more semiconductor parameters of the photosensitive element.

In some embodiments, the first supply voltage to the photo-signal converter $V_{sup,PSC}$, may differ from a second supply voltage to the light-to-time converter, $V_{sup,LTC}$. For example, the magnitude of $V_{sup,PSC}$ may be greater than that of $V_{sup,LTC}$. Such a difference in supply voltages may be beneficial where a wide dynamic range of processable light levels is desired, for example. In some cases, the photo-signal converter may need a sufficiently higher DC voltage range, and even more so if gain boosting is utilized, as disclosed herein. The required supply voltage to the photo-signal converter may not be reduced to values typically used in nanometer semiconductor technologies. Consequently, different semiconductor technologies may be used to implement the photo-signal converter versus the rest of the in-pixel circuitry, including the light-to-time converter. With such an approach, different supply voltages may be provided, as needed.

$V_{reset}$ itself is derived from or controlled by the "trigger" signal described with reference to the examples of FIGS. 5, 7, 8, 10, and 11 (or at least the release of it if already applied after the previous detection, as described above).

Figure 9A:
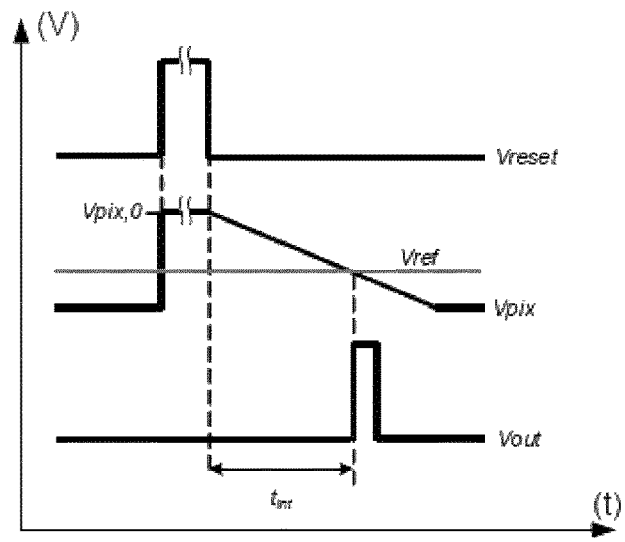
FIG. 9A is a graphical illustration of light-to-time conversion by the light-to-time converter of FIG. 7 or 8, according to embodiments of the present disclosure.

FIG. 9A is a graphical illustration of light-to-time conversion by light-to-time converter 700 of FIG. 7 or by light-to-time converter 800 of FIG. 8. As depicted in the example of FIG. 9A, the capacitor of the light-to-time converter begins charging (or discharging, as depicted in FIG. 9A) upon receipt of the trigger signal (represented by $V_{reset}$ in FIG. 9A). When the voltage across the capacitor reaches $V_{ref}$ a completion signal is generated (represented by $V_{out}$ in FIG. 9A). The intensity of the light (which is linearly proportional to the charging current) is thus encoded in the time (represented by $t_{int}$ in FIG. 9A) between the trigger signal and the completion signal, as explained above.

Figure 9B:
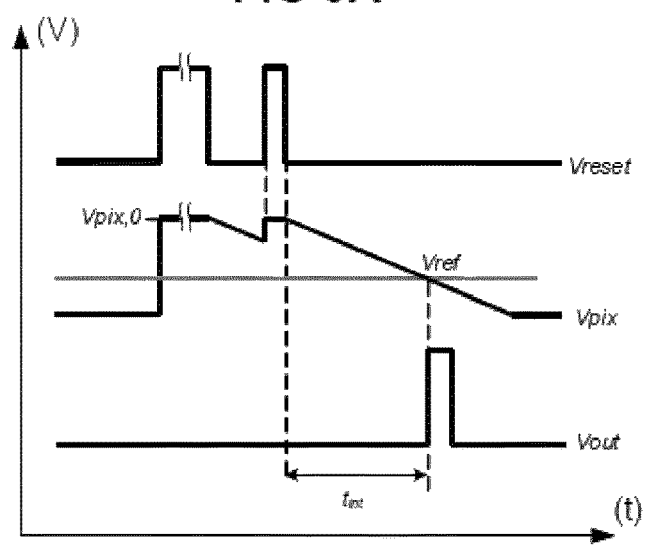
FIG. 9B is a graphical illustration of light-to-time conversion with rapid, sequential triggers by the light-to-time converter of FIG. 7 or 8, according to embodiments of the present disclosure.

FIG. 9B is a graphical illustration of light-to-time conversion with rapid, sequential triggers by light-to-time converter 700 of FIG. 7 or by light-to-time converter 800 of FIG. 8. As depicted in the example of FIG. 9B, the capacitor of the light-to-time converter begins charging (or discharging, as depicted in FIG. 9B) upon receipt of the trigger signal (represented by the first spike in $V_{reset}$ in FIG. 9B). However, the light-to-time converter receives a second trigger signal (represented by the second spike in $V_{reset}$ in FIG. 9B) before $V_{ref}$ has been reached. Accordingly, the light-to-time converter rapidly discharges (or charges) the capacitor (e.g., by flipping a switch to connect the capacitor to a ground or other voltage supply) and then begins charging (or discharging) the capacitor again (e.g., by opening the switch). When the voltage across the capacitor reaches $V_{ref}$ a completion signal (represented by $V_{out}$ in FIG. 9B) is then generated, as in FIG. 9A. Although not depicted in FIG. 9B, the light-to-time converter may send a cancellation signal to a readout circuit between the two triggers, e.g., such that a time-to-digital conversion of the first measurement is cancelled. For example, in some embodiments, such a cancellation signal may be derived from the second trigger signal (represented by the second spike in $V_{reset}$ in FIG. 9B). Moreover, the intensity of the light (which is linearly proportional to the charging current) may thus be encoded in the time (represented by $t_{int}$ in FIG. 9A) between the cancellation signal and the completion signal.

Figure 9C:
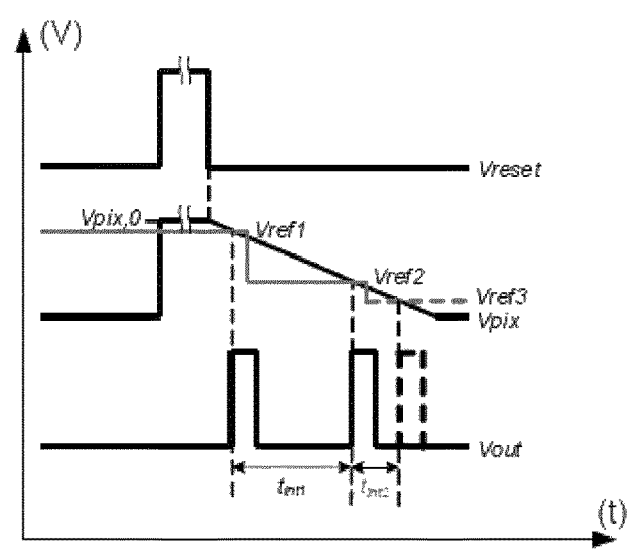
FIG. 9C is a graphical illustration of light-to-time conversion with a changing reference voltage by the light-to-time converter of FIG. 7 or 8, according to embodiments of the present disclosure.

FIG. 9C is a graphical illustration of light-to-time conversion with a changing reference voltage by light-to-time converter 700 of FIG. 7 or by light-to-time converter 800 of FIG. 8. As depicted in the example of FIG. 9C, the capacitor of the light-to-time converter begins charging (or discharging, as depicted in FIG. 9C) upon receipt of the trigger signal (represented by $V_{reset}$ in FIG. 9c). When the voltage across the capacitor reaches $V_{ref1}$, a first completion signal (represented by the first spike in $V_{out}$ in FIG. 9C) is generated. When the voltage across the capacitor reaches $V_{ref2}$, a second completion signal (represented by the second spike in $V_{out}$ in FIG. 9C) is generated. When the voltage across the capacitor reaches $V_{ref3}$, a final completion signal (represented by the third spike in $V_{out}$ in FIG. 9C) is generated. Although depicted with three reference voltages, any number of reference voltages, such as two, four, five, or the like, may be used. The intensity of the light (which is linearly proportional to the charging current) is thus encoded in the times between the signals (represented by $t_{int1}$ and $t_{int2}$ in FIG. 9c), as explained above. The use of multiple completion signals may be used for signal smoothing and/or error correction, as explained above.

Figure 10:
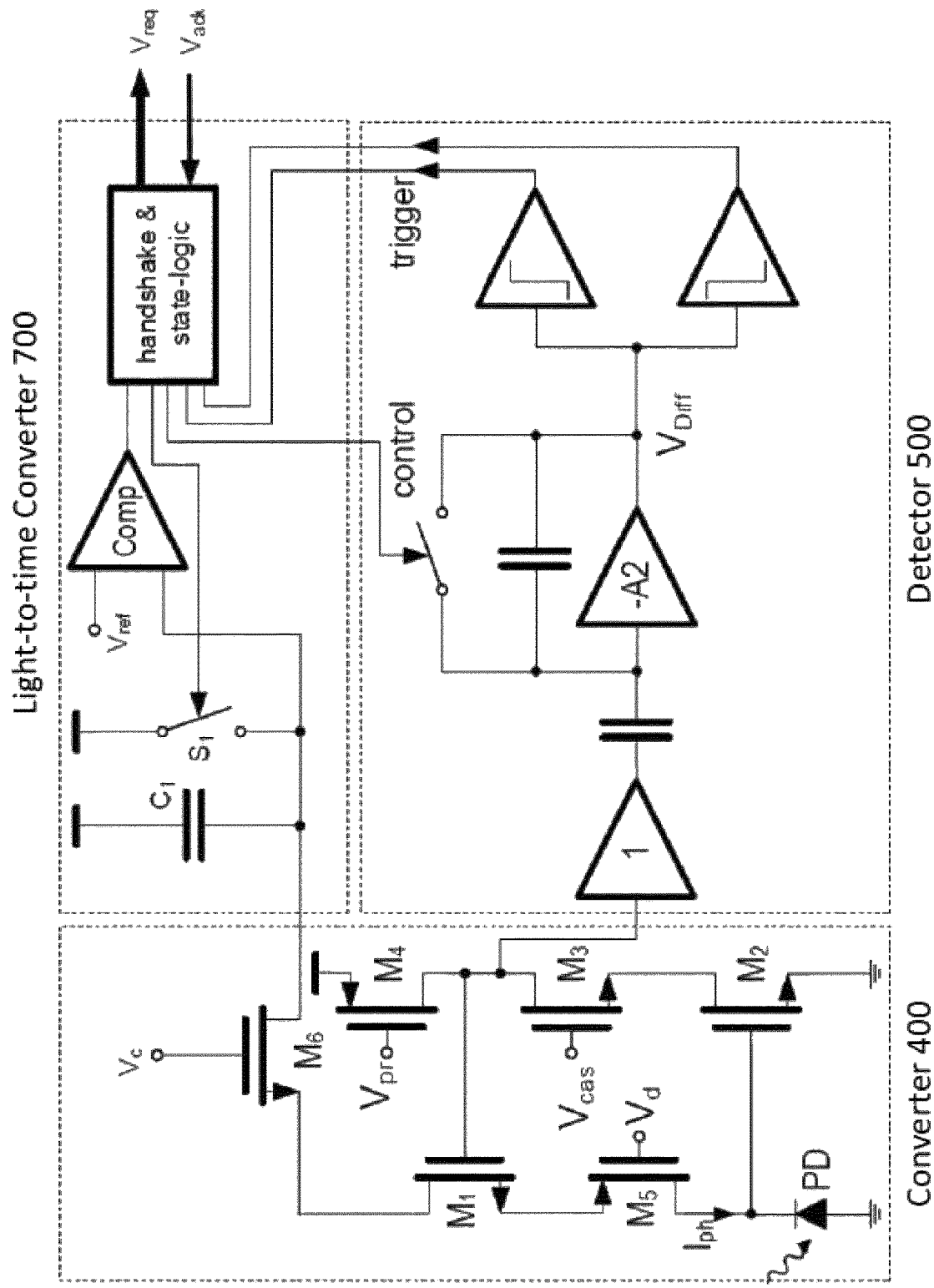
FIG. 10 is a schematic representation of an exemplary pixel of an image sensor, according to embodiments of the present disclosure.

FIG. 10 is a schematic representation of an exemplary image sensor including converter 400 of FIG. 4A, detector 500 of FIG. 5, and light-to-time converter 700 of FIG. 7. As depicted in FIG. 10, converter 400 has a first output connected to light-to-time converter 700 and a second output connected to detector 500. Detector 500 sends trigger signals to light-to-time converter 700, and light-to-time converter sends control signals to detector 500. Finally, light-to-time converter 700 sends signals to readout circuitry (not shown) via the Req bus and may receive acknowledgment signals via the Ack bus.

Figure 11:
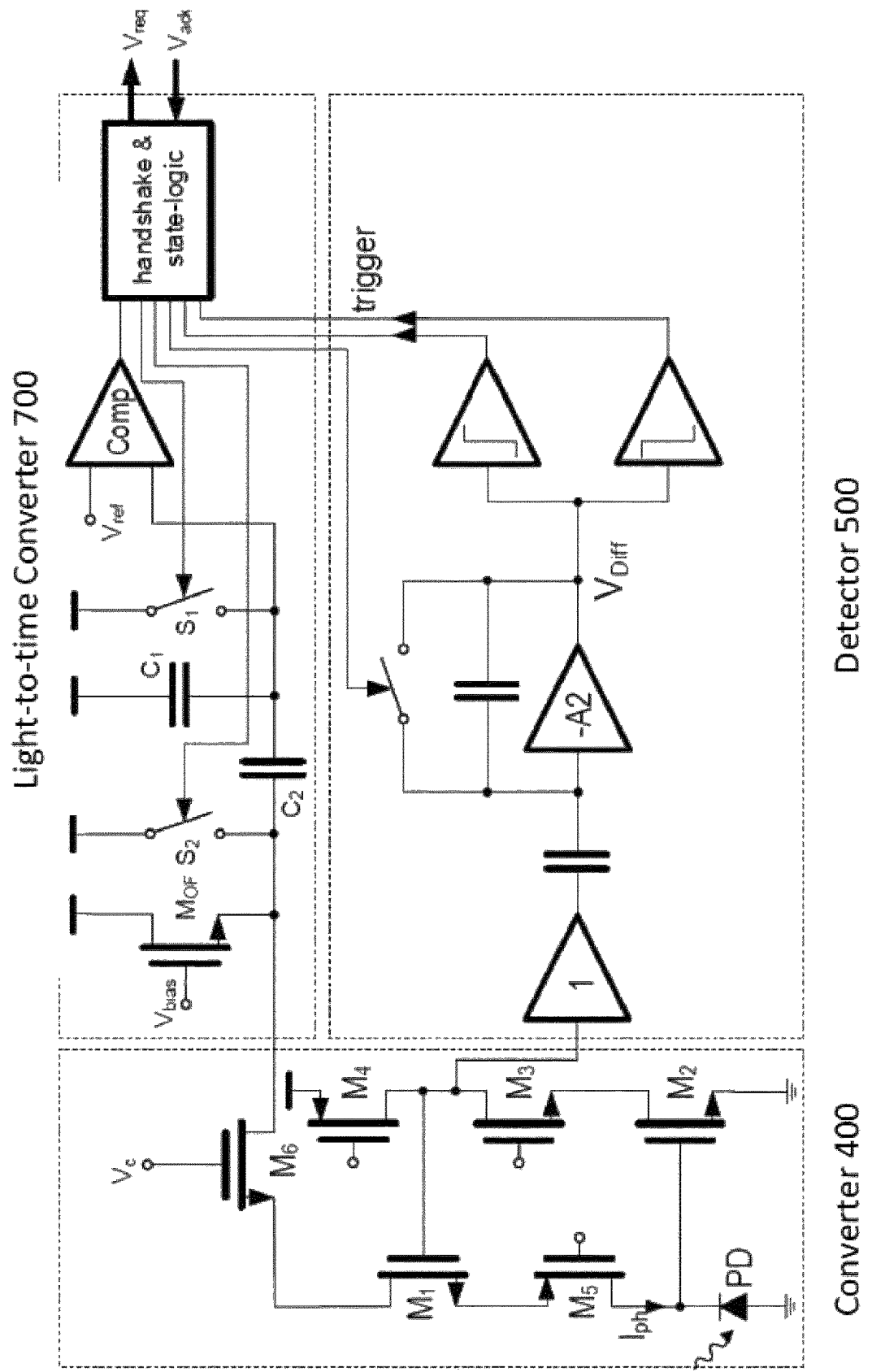
FIG. 11 is a schematic representation of another exemplary pixel of an image sensor, according to embodiments of the present disclosure.

FIG. 11 is a schematic representation of another exemplary image sensor including converter 400 of FIG. 4A, detector 500 of FIG. 5, and light-to-time converter 800 of FIG. 8. As depicted in FIG. 11, converter 400 has a first output connected to light-to-time converter 800 a second output connected to detector 500. Detector 500 sends trigger signals to light-to-time converter 800, and light-to-time converter sends control signals to detector 500. Finally, light-to-time converter 800 sends signals to readout circuitry (not shown) via the Req bus and may receive acknowledgment signals via the Ack bus.

Figure 12:
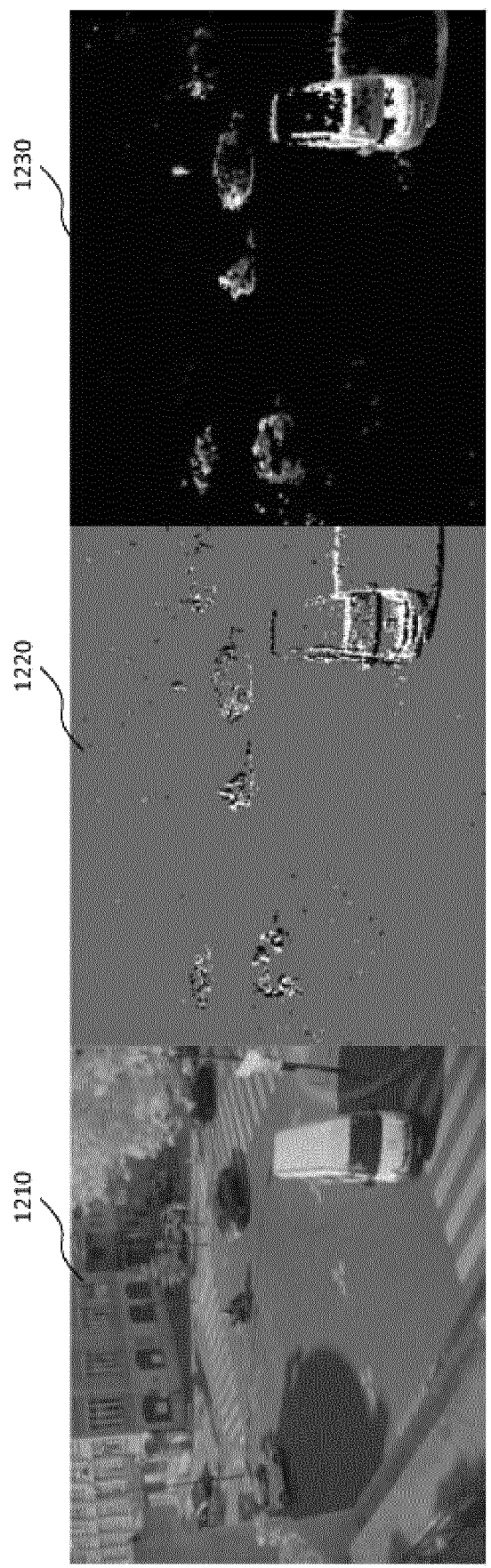
FIG. 12 depicts example outputs from extant image sensors and image sensors according to embodiments of the present disclosure.

FIG. 12 depicts example output 1210 from extant image sensors in comparison to example outputs 1220 and 1230 from image sensors according to embodiments of the present disclosure, e.g., image sensors comprising pixels of FIGS. 10 and 11. As depicted in FIG. 12, a full image 1210 includes significant extraneous detail on account of stationary background within the image. The output 1220 of an image sensor depicted in FIG. 10 or in FIG. 11 may be represented as contrast detection events (e.g., black pixels representing negative change and white pixels representing positive change, the gray areas being non-activated pixels). Accordingly, the output of an image sensor depicted in FIG. 10 or in FIG. 11 may be used to develop a black-and-white picture 1230 of motion within the scene. Picture 1230 may be generated using intensity levels from the pixels that are activate in output 1220. As can be seen, output 1220 and picture 1230 contain significantly less data and are therefore easier and more efficient to post-process, e.g., for tracking or recognizing changes within a scene, than full image 1210.

In order to fabricate different portions of a pixel constructed in accordance with the present disclosure, the photo-signal converter may require one particular voltage range while other portions of the pixel (such as the light-to-time converter, the detector, or the like) may require a different voltage range, e.g., in order to perform miniaturization and/or scalability of manufacturing. For example, as discussed above, the supply voltage to the photo-signal converter may be different and higher than that supplied to the light-to-time converter.

Accordingly, in some embodiments, different semiconductor technologies may be used to implement the photo-signal converter and the rest of the in-pixel circuitry of the image sensor, respectively. For example, the two semiconductor processes (which may be based on different base technologies, have different minimum feature sizes, have different supply voltages, or the like) may be separately optimized for the two circuit types. The results of these processes (i.e., the photo-signal converter and the rest of the in-pixel circuitry) may then be integrated using wafer-to-wafer stacking technology.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. An asynchronous time-based image sensor that includes a plurality of pixels, each pixel comprising:
   a photosensitive element;
   a photo-signal converter connected to the photosensitive element and configured to provide at a first output a current signal linearly proportional to an intensity of light impinging on the photosensitive element, and to provide at a second output a voltage signal logarithmic with the intensity of light impinging on the photosensitive element;
   a detector configured to generate, autonomously and independently of detectors of other pixels, a trigger signal when a signal of the detector proportional to the voltage signal of the second output of the photo-signal converter exceeds a threshold; and
   a light-to-time converter connected to the first output of the photo-signal converter and configured to measure and encode, in a time domain, light intensity on the photosensitive element, wherein a light-to-time conversion cycle is initiated by the light-to-time converter in response to receipt of the trigger signal from the detector.

2. The asynchronous time-based image sensor of claim 1, wherein the light-to-time converter is configured to communicate at least one of initiation of the light-to-time conversion cycle or completion of the light-to-time conversion cycle to a readout system external to the plurality of pixels.

3. The asynchronous time-based image sensor of claim 2, wherein the light-to-time converter comprises a capacitor configured to be charged during the light-to-time conversion cycle by the current signal of the first output of the photo-signal converter, and wherein the light-to-time conversion cycle is completed by the light-to-time converter in response to detecting, with a comparator, that a voltage across the capacitor reaches a reference voltage.

4. The asynchronous time-based image sensor of claim 3, wherein the readout system is configured to combine address information for each pixel with the light-to-time conversion cycle initiation and completion information received from the light-to-time converter of the respective pixel, and wherein the address information and the light-to-time conversion cycle initiation and completion information is synchronized and time-stamped by a digital processing system external to the plurality of pixels.

5. The asynchronous time-based image sensor of claim 3, wherein the reference voltage is variable between a plurality of reference voltage levels, and wherein the reference voltage is decreased to a different reference voltage level when the voltage across the capacitor reaches the reference voltage.

6. The asynchronous time-based image sensor of claim 1, wherein the light-to-time converter is configured to initiate the light-to-time conversion cycle by opening a switch in parallel with a capacitor or closing the switch to discharge the capacitor before opening the switch.

7. The asynchronous time-based image sensor of claim 1, wherein the light-to-time converter is configured to send a reset signal to the detector in response to the receipt of the trigger signal from the detector.

8. The asynchronous time-based image sensor of claim 1, wherein the light-to-time converter is configured to reset and initiate a new light-to-time conversion cycle when another trigger signal is received before completion of a current light-to-time conversion cycle.

9. The asynchronous time-based image sensor of claim 1, wherein a first supply voltage to the photo-signal converter differs from a second supply voltage to the light-to-time converter.

10. The asynchronous time-based image sensor of claim 1, wherein the photo-signal converter is a gain-boost photo-signal converter.

11. The asynchronous time-based image sensor of claim 1, wherein the light-to-time converter comprises:
- a capacitor and a switch connected in parallel to the first output of the photo-signal converter;
- a comparator connected to the first output; and
- a logic circuit, connected to the comparator and the detector configured to initiate the light-to-time conversion cycle by opening the switch in response to the receipt of the trigger signal from the detector, configured to complete the light-to-time conversion cycle in response to the comparator detecting that a voltage across the capacitor reaches a reference voltage, and configured to communicate initiation and completion of the light-to-time conversion cycle to a readout system external to the asynchronous time-based image sensor,
- wherein the capacitor is configured to be charged during the light-to-time conversion cycle by the current signal of the first output of the photo-signal converter.

12. The asynchronous time-based image sensor of claim 11, wherein a first supply voltage to the photo-signal converter differs from a second supply voltage to the capacitor, the switch, and the comparator.

13. A method for providing asynchronous time-based image sensing with a plurality of pixels, each pixel comprising a photosensitive element, a photo-signal converter connected to the photosensitive element, a detector, and a light-to-time converter connected to the photo-signal converter, the method comprising:
- providing, at a first output of the photo-signal converter, a current signal linearly proportional to an intensity of light impinging on the photosensitive element;
- providing, at a second output of the photo-signal converter, a voltage signal logarithmic with the intensity of light impinging on the photosensitive element;
- generating, with the detector and autonomously and independently of detectors of other pixels, a trigger signal when a signal of the detector proportional to the voltage signal of the second output of the photo-signal converter exceeds a threshold; and
- encoding, with the light-to-time converter, light intensity on the photosensitive element into time elapsing information, the time elapsing information comprising an initiation time of a light-to-time conversion cycle and a completion time of the light-to-time conversion cycle,
- wherein the light-to-time conversion cycle is initiated by the light-to-time converter in response to receipt of the trigger signal from the detector.

14. The method of claim 13, further comprising:
- communicating, with the light-to-time converter, the initiation time of the light-to-time conversion cycle to a readout system external to the plurality of pixels; and
- communicating, with the light-to-time converter, the completion time of the light-to-time conversion cycle to the readout system.

15. The method of claim 14, further comprising:
- charging, during the light-to-time conversion cycle, a capacitor using the current signal of the first output of the photo-signal converter;
- detecting, with a comparator, the completion time of the light-to-time conversion cycle when a voltage across the capacitor reaches a reference voltage;
- combining, at the readout system, address information for each pixel with the light-to-time conversion cycle initiation and completion information received from the light-to-time converter of the respective pixel; and
- synchronizing and time-stamping the address information and the light-to-time conversion cycle initiation and completion information by a digital processing system external to the plurality of pixels.

16. The method of claim 15, further comprising:
- varying the reference voltage between a plurality of reference voltage levels.

17. The method of claim 13, further comprising at least one of:
- opening a switch in parallel with a capacitor to initiate the light-to-time conversion cycle; or
- closing the switch to discharge the capacitor before opening the switch to initiate the light-to-time conversion cycle.

18. The method of claim 13, further comprising:
- sending a reset signal to the detector in response to the receipt of the trigger signal from the detector.

19. The method of claim 13, further comprising:
- in response to receiving another trigger signal before completion of a current light-to-time conversion cycle, resetting and initiating a new light-to-time conversion cycle; and
- sending a cancellation signal to a readout system external to the plurality of pixels.

20. The method of claim 16, further comprising:
- decreasing the reference voltage to a lower reference voltage level when the voltage across the capacitor reaches the reference voltage.

\* \* \* \* \*